(12) United States Patent
Ijaz et al.

(10) Patent No.: US 12,160,785 B2
(45) Date of Patent: Dec. 3, 2024

(54) SYSTEMS AND METHODS FOR SECURE AND RELIABLE COMMAND AND CONTROL OF IN-FLIGHT UNCREWED AERIAL VEHICLES VIA PUBLIC LAND MOBILE NETWORKS

(71) Applicant: INTERDIGITAL PATENT HOLDINGS, INC., Wilmington, DE (US)

(72) Inventors: Aneeqa Ijaz, Tulsa, OK (US); Samir Ferdi, Kirkland (CA); Guanzhou Wang, Brossard (CA); Atle Monrad, Froland (NO); Taimoor Abbas, Sainte-Julie (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/681,125

(22) PCT Filed: Aug. 4, 2022

(86) PCT No.: PCT/US2022/039410
§ 371 (c)(1),
(2) Date: Feb. 5, 2024

(87) PCT Pub. No.: WO2023/014876
PCT Pub. Date: Feb. 9, 2023

(65) Prior Publication Data
US 2024/0267817 A1 Aug. 8, 2024

Related U.S. Application Data

(60) Provisional application No. 63/230,405, filed on Aug. 6, 2021, provisional application No. 63/307,476, filed
(Continued)

(51) Int. Cl.
*H04W 36/00* (2009.01)
*H04W 36/14* (2009.01)
*H04W 36/36* (2009.01)

(52) U.S. Cl.
CPC ..... *H04W 36/1443* (2023.05); *H04W 36/142* (2023.05); *H04W 36/1446* (2023.05); *H04W 36/362* (2023.05)

(58) Field of Classification Search
CPC .......... H04W 36/1446; H04W 36/142; H04W 36/362
(Continued)

(56) References Cited

U.S. PATENT DOCUMENTS

2007/0232278 A1* 10/2007 May .................. H04M 1/72451
455/566

OTHER PUBLICATIONS

3GPP TSG SA WG5, "Reply LS on Edge computing definition and integration," 3GPP TSG-SA WG6 Meeting #44, S6-211511, e-meeting (Jul. 12-20, 2021).
(Continued)

*Primary Examiner* — Marcos Batista
(74) *Attorney, Agent, or Firm* — Volpe Koenig

(57) ABSTRACT

Systems and methods for supporting multiple uncrewed aerial vehicle (UAV) Service Suppliers (multi-USS) are described. The methods may be performed by a wireless transmit/receive unit (WTRU) including a UAV application enabling (UAE) client located in the UAV with the method performed with the UAV in-flight. Steps may include: sending a registration request to a UAE server, the registration request including an indication of multi-USS capability; receiving a registration response message that includes an indication that the UAE server supports multi-USS capability; receiving a multi-USS configuration request that includes multi-USS configuration parameters related to conditions under which the UAE client may initiate a USS
(Continued)

change and a list of allowed USSs; sending a multi-USS configuration response; and performing a multi-USS change and sending a multi-USS change notification based on the multi-USS configuration parameters.

20 Claims, 19 Drawing Sheets

Related U.S. Application Data on Feb. 7, 2022, provisional application No. 63/324,887, filed on Mar. 29, 2022.

(58) Field of Classification Search
USPC .......................................... 370/331; 455/312
See application file for complete search history.

(56) References Cited

OTHER PUBLICATIONS

Federal Aviation Administration and National Aeronatuics and Space Administration, UTM RTT CWG Concept & Use Cases Package #2, Technical Capability Level 3, Version 1.0 (Mar. 2018).
Federal Aviation Administration, Concept of Operations V2.0, Unmanned Aircraft System (UAS) Traffic Management (UTM) (2020).
GSMA, ACJA—WT2: Interface for Data Exchange between MNOs and the UTM Ecosystem, NetworkCoverage Service Definition V1.00 (Feb. 2021).
Hatfield et al., "Integration of Unmanned Aircraft Systems into the Nationals Airspace System-Efforts by the University of Alaska to Support the FAA/NASA UAS Traffic Management Program," Remote Sensing (2020).
Interdigital, "New KI on change of USS / UTM during flight," 3GPP TSG-SA WG6 Meeting #46-e, S6-212506, e-meeting (Nov. 15-23, 2021).
Interdigital, "New SID on enhanced architecture for UAS applications," 3GPP TSG-SA WG6 Meeting #44-e, S6-211528, E-meeting (Jul. 12-20, 2021).
Interdigital, "New SID on enhanced architecture for UAS applications," 3GPP TSG-SA WG6 Meeting #45-e, S6-211869, E-meeting (Aug. 25-Sep. 3, 2021).
Interdigital, "Revised SID on Study on enhanced architecture for UAS Applications" 3GPP TSG-SA WG6 Meeting #45-bis-e, S6-212197, e-meeting (Oct. 11-19, 2021).
Interdigital, "Solution to KI#2—Change of USS during flight," 3GPP TSG-SA WG6 Meeting #47-e, S6-220207, e-meeting (Feb. 14-22, 2022).
Qualcomm Incorporated, "New SID on Study of Further Architecture Enhancement for UAV and UAM," 3GPP TSG SA2 Meeting #145E (e-meeting), S2-2103785, Emeeting (May 17-28, 2021).
Qualcomm Incorporated, "New SID on Study of Further Architecture Enhancement for UAV and UAM," SA WG2 Meeting #S2-147E, S2-2107092, Electronic meeting (Oct. 18-22, 2021).
Third Generation Partnership Project, "Technical Specification Group Services and System Aspects; Application layer support for Uncrewed Aerial System (UAS); Functional architecture and information flows; (Release 17)," 3GPP TS 23.255 V17.2.0 (Dec. 2021).
Third Generation Partnership Project, "Technical Specification Group Services and System Aspects; Application layer support for Uncrewed Aerial System (UAS); Functional architecture and information flows; (Release 17)," 3GPP TS 23.255 V17.3.0 (Mar. 2022).
Third Generation Partnership Project, "Technical Specification Group Services and System Aspects; Application layer support for Uncrewed Aerial System (UAS); Functional architecture and information flows; (Release 17)," 3GPP TS 23.255 V17.0.1 (Jun. 2021).
Third Generation Partnership Project, "Technical Specification Group Services and System Aspects; Study on enhanced Application Architecture for UAS applications; (Release 18)," 3GPP TR 23.700-55 V0.2.0 (Nov. 2021).
Third Generation Partnership Project, "Technical Specification Group Services and System Aspects; Study on enhanced Application Architecture for UAS applications; (Release 18)," 3GPP TR 23.700-55 V0.6.0 (Jul. 2022).
Third Generation Partnership Project, "Technical Specification Group Core Network and Terminals; Uncrewed Aerial System (UAS) Application Enabler (UAE) layer; Protocol aspects; Stage 3 (Release 17)," 3GPP TS 24.257 V17.1.0 (Jun. 2022).
Third Generation Partnership Project, "Technical Specification Group Core Network and Terminals; Uncrewed Aerial System (UAS) Application Enabler (UAE) layer; Protocol aspects; Stage 3 (Release 17)," 3GPP TS 24.257 V0.1.0 (Jun. 2021).
Third Generation Partnership Project, "Technical Specification Group Services and System Aspects; Support of Uncrewed Aerial Systems (UAS) connectivity, identification and tracking; Stage 2 (Release 17)," 3GPP TS 23.256 V17.3.0 (Jun. 2022).
Third Generation Partnership Project, "Technical Specification Group Services and System Aspects; Support of Uncrewed Aerial Systems (UAS) connectivity, identification and tracking; Stage 2 (Release 17)," 3GPP TS 23.256 V1.0.0 (Jun. 2022).
Huawei et al., Update to architecture, 3GPP TSG-SA WG6 Meeting #38-e, S6-201646, e-meeting (Aug. 31-Sep. 8, 2020).
Interdigital, Various fixes to TR 23.700-55, 3GPP TSG-SA WG6 Meeting #49bis-e, S6-221519, e-meeting (Jun. 22-Jul. 1, 2022).
Tencent et al., Pseudo-CR on key issue x: UTM/USS service handoff, 3GPP TSG-SA WG6 Meeting #38-e, S6-201040, e-meeting (Jul. 20-31, 2020).
Third Generation Partnership Project, "Technical Specification Group Services and System Aspects; Study on application layer support for Unmanned Aerial Systems (UAS) (Release 17)," 3GPP TR 23.755 V17.0.0 (Apr. 2021).

* cited by examiner

SYSTEMS AND METHODS FOR SECURE AND RELIABLE COMMAND AND CONTROL OF IN-FLIGHT UNCREWED AERIAL VEHICLES VIA PUBLIC LAND MOBILE NETWORKS

CROSS-REFERENCE TO RELATED APPLICATIONS

This application is the U.S. National Stage, under 35 U.S.C. § 371, of International Application No. PCT/US2022/039410 filed Aug. 4, 2022, which claims the benefit of U.S. Provisional Application Nos. 63/324,887 filed Mar. 29, 2022; 63/307,476 filed Feb. 7, 2022; and 63/230,405 filed Aug. 6, 2021, the contents of all three of which are incorporated herein by reference.

BACKGROUND

Uncrewed aerial vehicles (UAV) can help solve important challenges in transportation, commerce, and public service. A uncrewed aerial system (UAS) comprises a UAV and a UAV controller (UAV-C). Success of UAV missions as well as human safety depends upon reliable, robust and secure command and control (C2) communication links between a UAV and a UAV-C. Unreliable C2 links can result in accidents, aborted or failed missions, UAV flight discontinuations or UAV emergency landings. To avoid these and other adverse consequences, there is a need for systems and methods that provide reliable, robust and secure C2 links for in-flight UAS throughout a planned route, in particular where a UAV operates beyond what would be a human UAV controller's visual line of sight (BVLOS). Disclosed, described and claimed herein are systems and methods by which an in-flight UAV can maintain reliable, robust and secure C2 links with a UAV controller throughout a planned route.

There is also a need for enhancements to the Application Architecture for UAS applications. More specifically, there is a need to support multi-UAV service supplier (USS) deployments and enhancement of the UAV Application Enabling (UAE) layer to support change of USS and UAS Traffic Management (UTM) during flight. As the various USSs supporting the UAV may be deployed in different Data Networks (DN) including in an Edge Data Networks (EDN) there is also a need to define how UAE layer needs should assist the traffic steering of UAS application traffic to different DN/EDN to avoid application service disruption while in-flight.

SUMMARY

Methods, systems, and apparatuses for reliable in-flight command and control of uncrewed aerial vehicles (UAV) via public land mobile networks (PLMN) are disclosed. Systems and methods for supporting multiple uncrewed aerial vehicle (UAV) Service Suppliers (multi-USS) are described. The methods may be performed by a wireless transmit/receive unit (WTRU) including a UAV application enabling (UAE) client located in the UAV with the method performed with the UAV in-flight. Steps may include: sending a registration request to a UAE server, the registration request including an indication of multi-USS capability; receiving a registration response message that includes an indication that the UAE server supports multi-USS capability; receiving a multi-USS configuration request that includes multi-USS configuration parameters related to conditions under which the UAE client may initiate a USS change and a list of allowed USSs; sending a multi-USS configuration response; and performing a multi-USS change and sending a multi-USS change notification based on the multi-USS configuration parameters.

Solutions to support multi-USS using enhanced UAE are described herein.

In one example a UAE client may register with a UAE Server. This process may begin when UAE client sends a Registration request to a UAE Server including an indication of multi-USS capability. UAE server may interact with a serving USS (e.g., default, main/primary USS for the UAV) for authentication and authorization checks and may indicate a UAE client multi-USS capability and/or UAE client contextual information (e.g., current location, serving PLMN information, stipulated forward flight path). How the UAV current location may be determined is described in examples below. The UAE server may also indicate to the serving USS the UAE server multi-USS capability and possible UAE server contextual information (e.g., current location and/or served geographical area(s), serving PLMN(s) and coverage information, current/max served UAVs capacity, stipulated forward flight path). UAE server may receive a confirmation message from the USS that may include any of list of allowed USSes information (e.g., USS ID, IP address, DN/EDN), a multi-USS support policy (examples provided below). The confirmation message may also include USS-change-initiation information. The USS-change-initiation information may also include information related to the UAE server and the UAE client, and to what extent the USS allows the UAE layer (UAE server and/or UAE client) to initiate the change of USS. The confirmation message may also include a serving USS information (e.g., USS ID, IP address, DN/EDN) that may be different from the current serving USS. The (e.g., new) serving USS and other authorized USS may be assigned based on the UAV geographic area, serving PLMN, times and other operational constraints (e.g., QoS requirements for UAV-USS communications, current traffic volume or stipulated forward flight path) as determined by the USS network. The UAE server may inform the 5G Core Network (5GC) about the new serving USS information via UAS NF as per above embodiments. For example, the UAE server may send to the UAS NF (e.g., on behalf of the USS network) the new serving USS, the list of authorized USSes. The 5GC UAS NF may use that information to determine that a USS request is authorized for a particular service/operation (e.g., location tracking of UAV, revocation of UAV authorization). The UAE client receives a Registration response from the UAE server including success indication if UAE server supports such capability. The message may include any of confirmation of multi-USS support, a list of allowed USS authorization information, (e.g., new) current serving USS information, USS-change-initiation information. If the provided current serving USS info is new, the UAE client may configure the UE to use the new USS address by informing the Application layer and/or lower layers to use the new serving USS address (e.g., for network remote id, telemetry). Alternatively, the multi-USS capability exchange between the UAE layer and the USS network may be initiated/negotiated during a dedicated management procedure as illustrated below.

Procedures for initiation of multi-USS support capability and multi-USS support configuration are described herein. More specifically, a method for multi-USS support enabled at a UAE server and UAE client upon a request from a USS is illustrated below. The UAE server may receive a multi- USS management request from a serving USS for managing the support for multi-USS. The request may include the UAV (UAE client) identification information and multi-USS configuration parameters described herein. The UAE server may send a response acknowledging support based on UAE client and server support for such capability. The UAE client may receive a multi-USS configuration request from the UAE server that includes any of list of allowed USSes information, a (e.g., new) current serving USS information, USS-change-initiation information, and a multi-USS support policy. The policy may include parameters and or rules on whether the UAE client may initiate change of USS (i.e., USS-change-initiation information parameter) and/or how the UAE client may handle a change of USS. For example, the policy may include rules for the UAV to communicate with a new USS from the list of allowed USSes in case of non-responsive current serving USS, or change of USS based on time of day, stipulated forward flight path or UAV geographical location, current serving PLMN (e.g., when UAV can be served by multiple PLMNs as described above) etc. The UAE client may store the multi-USS support configuration parameters and send a multi-USS support configuration response to the server. The server may store multi-USS support configuration parameters in the UAE client context. The UAE client may initiate the selection and communication with a (e.g., new) serving USS based on the multi-USS configuration parameters. The USS may also remove a USS from the multi-USS configuration for a UAE server/UAE client by removing all Multi-USS configuration parameters and provide the UAE server/UAE client with (e.g., only) the USS identifier for the USS in question.

A method for dynamically changing current serving USS enabled at a UAE server and UAE client upon a request from a USS and/or based on UAE client/server configuration is described herein. The UAE server may receive a USS change request from a USS. The request may include the UAV (UAE client) identification information, a new serving USS information and USS change authorization information (e.g., token), change constraints parameters (e.g., delay before change, geo location/area threshold for change). The UAE server may verify that the request is authorized. For example, the UAE server may verify that the multi-USS capability has been enabled for the UAV based on UAE client context information (e.g., current location, time of day, current serving PLMN, stipulated forward flight path) as described above. The UAE server may request the UAV geo-location from a location server in the UAV serving PLMN (e.g., via a UAS NF or Service Enabler Architecture Layer (SEAL) interface). The UAE server may verify that the request is sent by the current serving USS associated with the UAV (e.g., based on the UAE client context). If the request is sent by a different USS, the UAE server may verify that the requesting USS provided a valid authorization token (e.g., signed by the current serving USS). The UAE server may verify that the requesting USS is part of the list of allowed USSes in the UAE client context. The UAE server may update the list of allowed USS in the UAE client context to include the new USS information. The UAE client may receive a change of USS message from the UAE server that may including the new serving USS information. The UAE client may update the list of allowed USS in multi-USS support parameters using the new USS information (e.g., set as current, add to the list of allowed). If the request does not indicate a new USS serving information, the UAE client may select a new serving USS based on the stored multi-USS configuration parameters. The UAE client may initiate the communication with the new serving USS based on the multi-USS configuration parameters/change request. Alternatively, the UAE client may initiate the change of USS (e.g., without an explicit request from the UAE server), based on an application trigger from the application layer, based on the multi-USS configuration parameters (e.g., loss of communication with current serving USS, entering an area/PLMN roaming where change of USS is needed based on USS change policy). The UAE client may take into account the USS-change-initiation information. The UAE client may send a USS change report message that may include the new serving USS information, a cause code of USS change (e.g., loss of USS connection, USS triggered, location/time/PLMN connectivity trigger). The UAE server may update the USS information in the UAE client context accordingly (e.g., current serving USS). The UAE server may send a USS change response to the requesting USS or alternatively a USS change notification message that may include the new serving USS, and/or a cause code for change as provided by the UAE client. The notification message may be sent to the previous USS and/or new USS. The UAE servers may receive an acknowledgment for the USS change notification message from the USS.

Alternatively, the UAE server may initiate the change of USS (e.g., on behalf of the USS) based on USS provided multi-USS configuration parameters (e.g., USS-change-initiation information, multi-USS support policy). For example, if the UAE server is allowed to initiate a change of USS according to the USS-change-initiation information parameter, the UAE server may select the new USS from the multi-USS configuration according to policy (e.g., after determining that a USS change is needed when a UAV is entering/leaving an area of interest based on received UAV location from a location server) and may instruct the client to change to the new serving USS as per above embodiment.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

An Uncrewed aerial system (UAS) comprises an uncrewed aerial vehicle (UAV) and a UAV controller (UAV-C). UAS are often equipped for direct point-to-point communication with each other using the unlicensed industrial/scientific/medical (ISM) radio frequency band. However, communication in the ISM band has disadvantages. First, range of radio frequency signals in the ISM band is limited. Furthermore, the communication channels in this band can be unreliable, insecure, and incapable of supporting data rates suitable for command and control (C2) of UAV. These drawbacks can adversely impact UAV flight operations.

For example, during a UAV flight, the communication channel used to communicate with UAV-C may experience quality of service (QOS) degradation. This could result in command and control signals being dropped. The UAV might lose connectivity the UAV-C altogether, for example, due to an outage within a 3GPP (communication provider) network. For example, a segment of a UAV's planned route may be experiencing outages that would prevent the UAV from communicating with the UAV-C during that segment of the UAV route. In such circumstances a UAV support service (USS) may communicate with the UAV. For example, a UAV may receive directions from a USS by which the UAV navigation system can re-plan the rest of the UAV flight to avoid outages. In the course of the re-planning, the UAV may need to establish communication links with other network components to coordinate other relevant changes as directed by the USS. These tasks are challenging for an in-flight UAV to perform.

The USS may be operated by an entity that manages airspaces for UAS operations and provides interfaces to air traffic management (ATM) and air navigation service providers (ANSP). For any given geographical airspace, one or more USSs may share the management responsibility for different UAS operations. The UTM clients function may be UAS operators or UASs that access the UTM services via a USS.

A method by which a UAS is provided with reliable 3GPP network connectivity is proposed. The invention enables a UAV to operate on a route that meets the connectivity minimum service level requirements, or in the alternative to apply contingency/emergency communication procedures. In some embodiments, contingency/emergency operations are applied. Embodiments of the invention support beyond visual line-of-sight (BVLOS) operations and provide high performance, secure and reliable communication for communication between a UAV and a UAV-C.

Figure 1A:
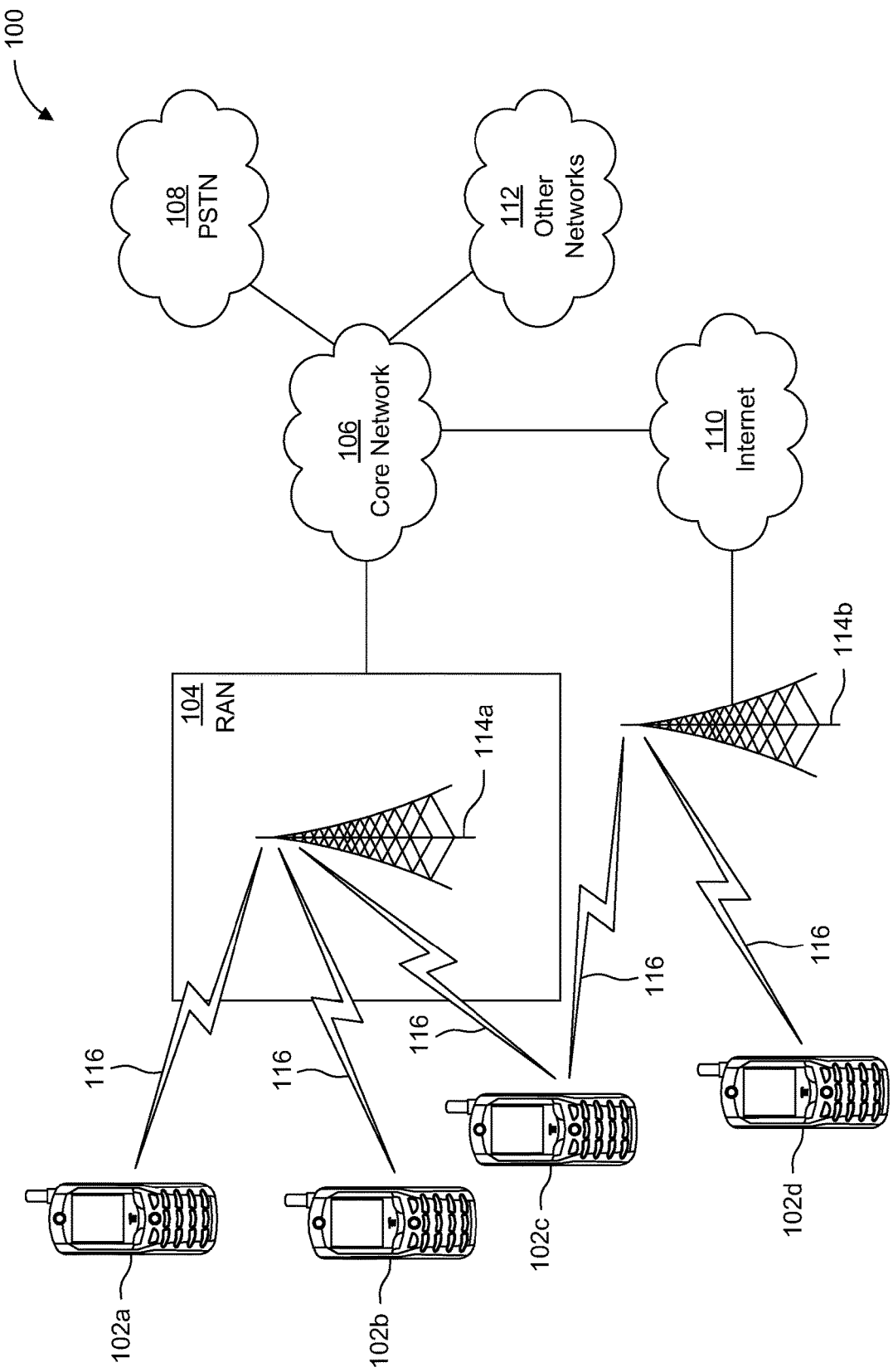
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108 (which may in some embodiments comprise a public land mobile network (PLMN)), the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone (including an uncrewed aerial vehicle (UAV)), a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology. Multiple WTRU transceivers, e.g., first and second transceivers can be provided within a single housing to comprise first and second user equipment (UE). Alternatively, a first UE can comprise a first WTRU transceiver and a second UE can comprise a second WTRU transceiver. A single WTRU transceiver can comprise a multi-mode transceiver for communicating with different wireless networks over different wireless links.

Figure 1B:
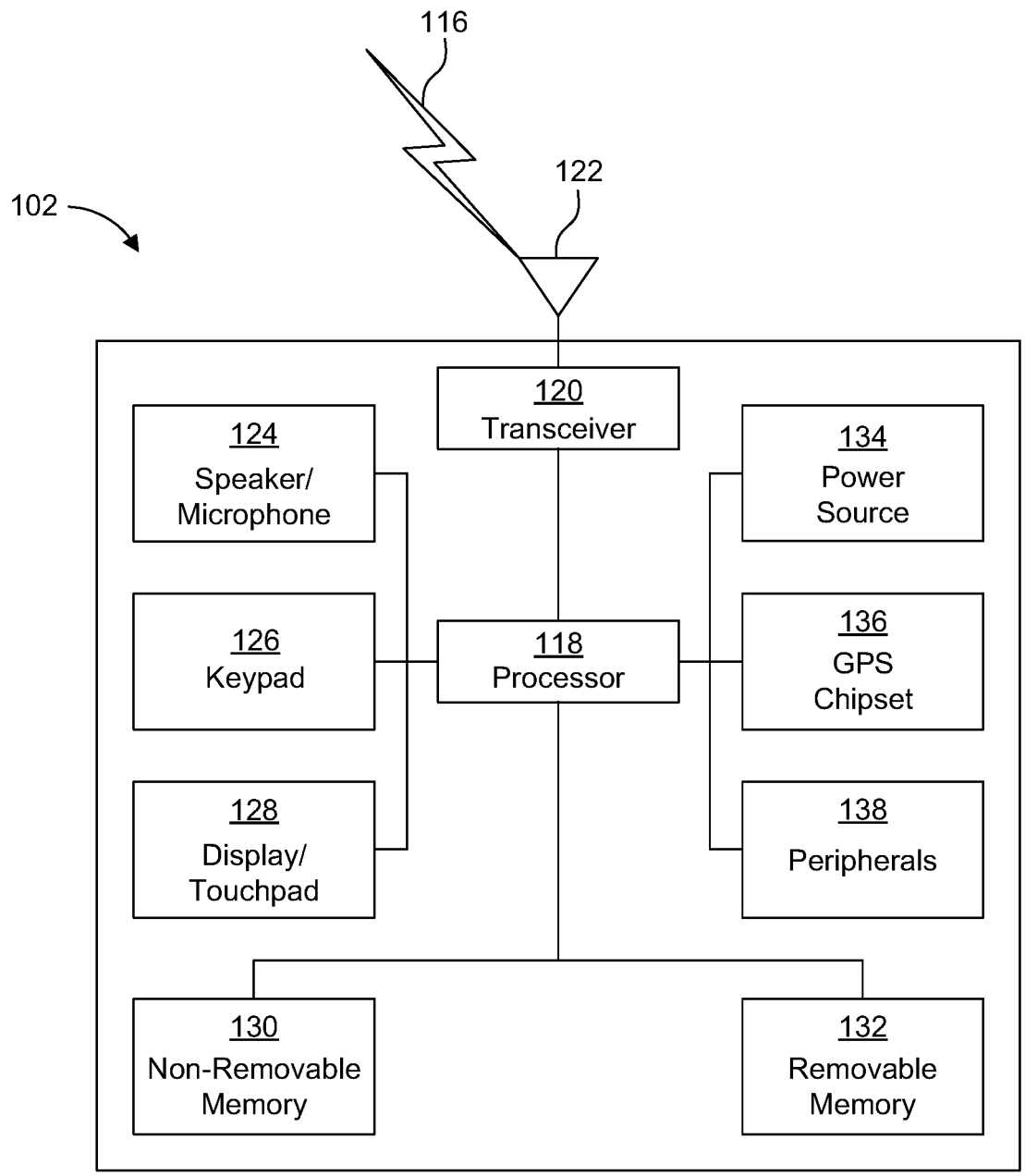
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment. In UAV embodiments processor 118 is configured to cooperate with GPS chipset 136 to provide current location of a WTRU, and thus current location of a UAV to a UAV controller (UAV-C), a network or one or more components thereof, a UAV service supplier (USS) or a UAV Traffic Management System (UTM) or one or more components thereof.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
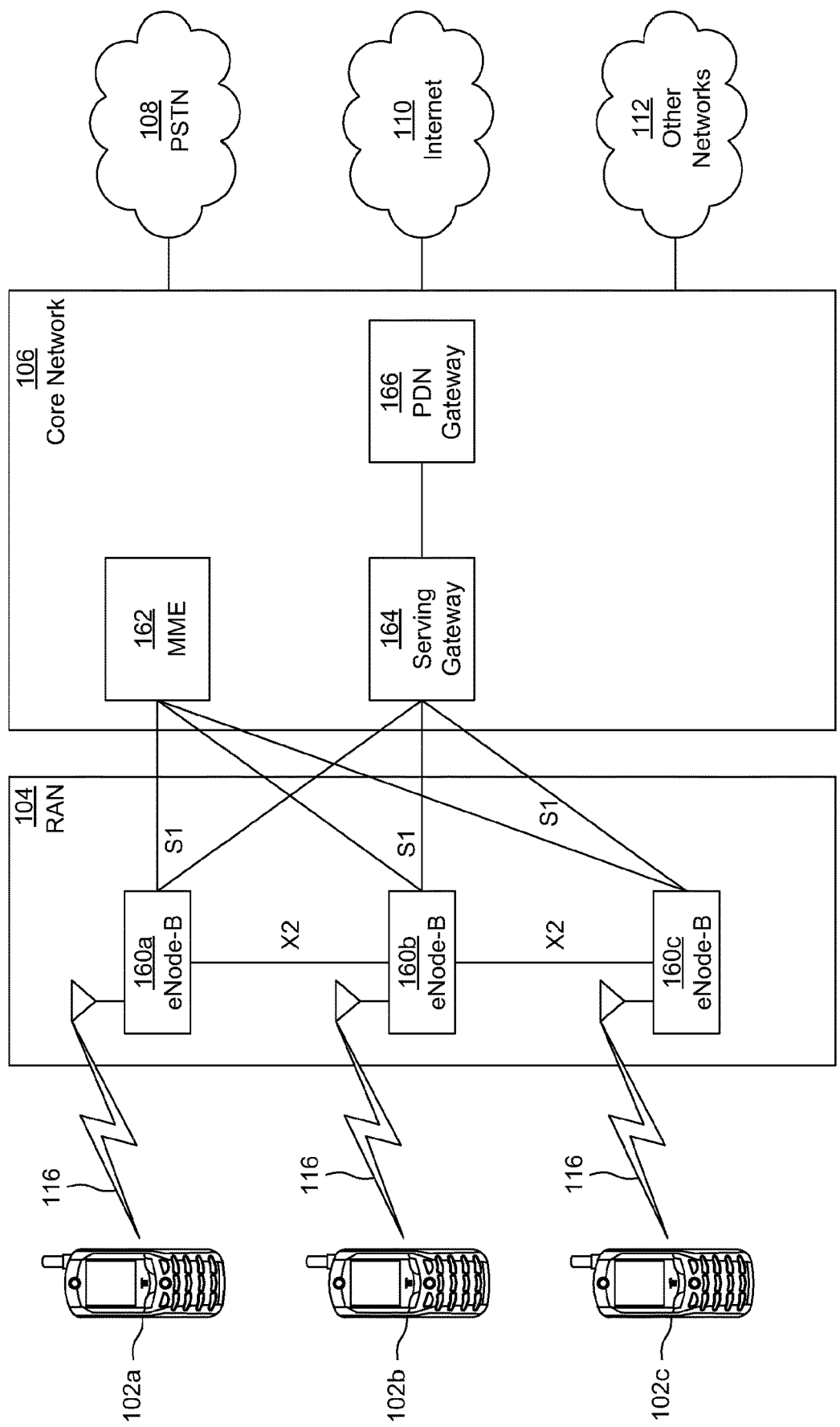
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHZ, and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
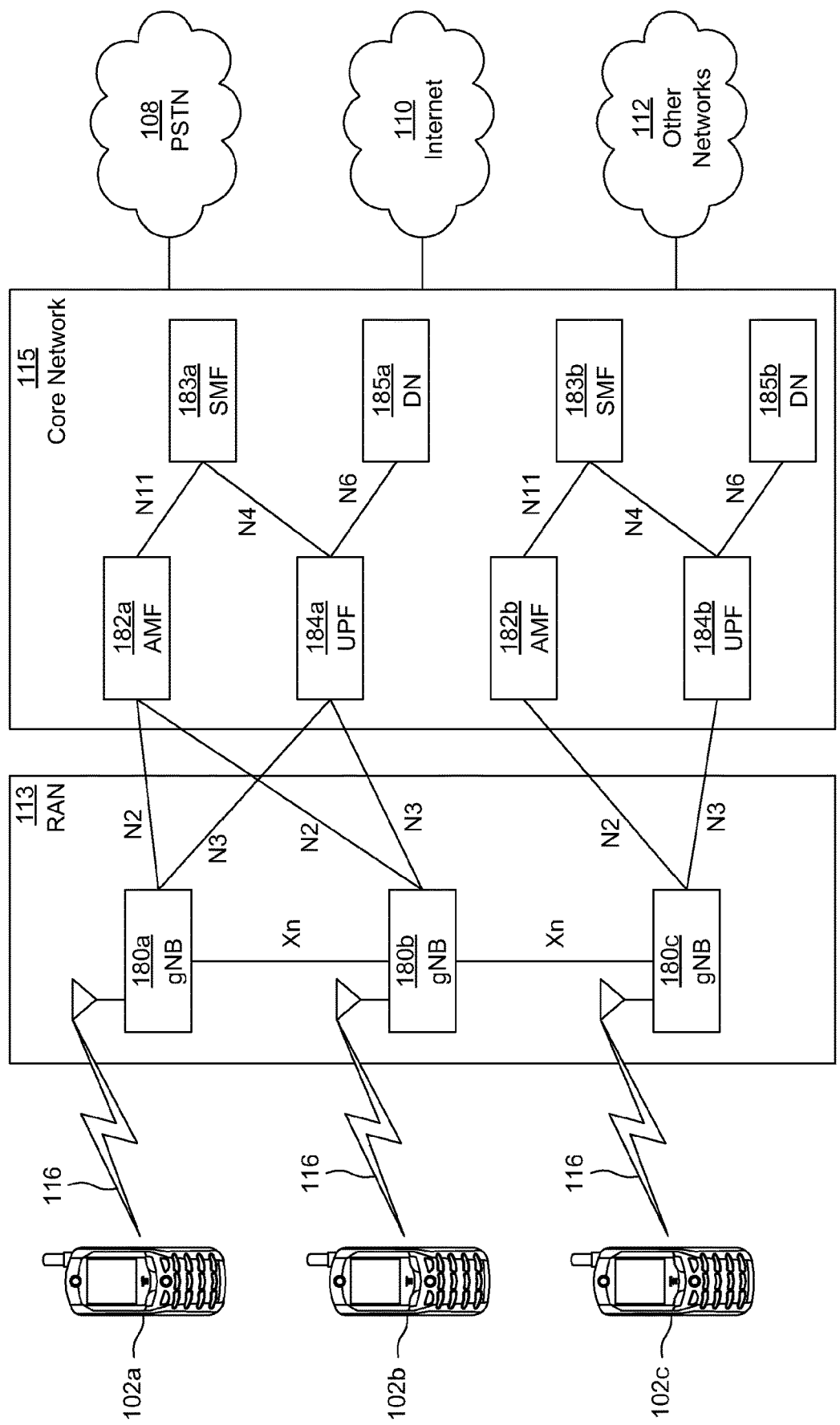
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi. In some embodiments, AMF 182a and/or AMF 182b further communicates with a USS or a UAV traffic management (UTM) system.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The following Acronyms may be referred to throughout the present application.

AA: Authenticating and Authorizing
AMF: Access and Mobility Management Function
BVLOS: Beyond Visual Line of Sight
C2: Command and Control
CAA: Civil Aviation Authority
CN: Core Network
FAA: Federal Aviation Administration
GPSI: Generic Public Subscription Identifier
ISM: Industrial, Scientific and Medical
MOPS: Minimum Operating Performance Standards
MUSIM: Multiple Subscriber Identity Module
NAS: Non-Access Stratum
NASA: National Aeronautics and Space Administration
NEF: Network Exposure Function
NF: Network Function
PCF: Policy Control Function
PDU: Packet Data Unit
PLMN: Public Land Mobile Network
RAN: Radio Access Network SMF: Session Management Function
UAS: Uncrewed Aerial System
UAS NF: UAS Network Function
UAV: Uncrewed Aerial Vehicle
UAV-C: UAV Controller
USS: UAS Service Supplier
UTM: UAS Traffic Management
UUAA: USS UAV Authorization/Authentication
UUAA-MM: UUAA-Mobility Management
UUAA-SM: UUAA-Session Management
WTRU: Wireless Transmit/Receive Unit Now turning to FIGS. 2-14 there are shown embodiments for secure and reliable command and control of in-flight UAV via public land mobile networks such as those described above.

For purposes of this specification an uncrewed aerial system (UAS) includes an uncrewed aerial vehicle (UAV) and a UAV controller (UAV-C). UAS rely on command and control (C2) communication links to carry telecommand and telemetry messages between the UAV and the UAV-C. C2 communication links can be established in the unlicensed ISM band. However, operation in this band has disadvantages. One disadvantage is limited communication range of ISM band signals. Other disadvantages include unreliability, lack of security, and low data rates of ISM band communication links. Many UAV applications call for UAV operation at ranges that extend well beyond visible line of sight (BVLOS). ISM band C2 communication links are unsuitable for those applications due to their limited range. Embodiments of the invention achieve extended operational ranges using public land mobile networks (PLMN) for C2 communications between UAV and UAVC. In particular, embodiments of the invention leverage advanced capabilities of 3GPP systems including 5G capabilities implemented using PLMN to support C2 communication between UAV and UAVC. In those embodiments reliable, robust and secure C2 communication links are particularly important for safe and successful UAV operations.

A UAS relying on a PLMN for C2 communication may experience unexpected degradations in the Quality of Service (QOS), network outages or other connectivity problems in one or more segments of a UAV planned flight route. To avoid adverse consequences of such problems, systems and methods are provided for facilitating switching UAE-UAVC C2 communications from a first PLMN to a second PLMN when the first PLNM does not meet given criteria. Methods are also provided for supporting communication or coordination activities that may be necessitated by such switching. The disclosed embodiments are directed to ensuring that UAS communicate throughout their routes over PLMN that meet network connectivity minimum service level requirements.

The number of UAV has been rapidly growing in recent years and the applications for UAV are expanding into a wide variety of industries. Various regulators including FAA/NASA and industry groups have developed models and requirements for UAV traffic management (UTM) to ensure safe and secure operation of UAV in unregulated airspace. Accordingly, a UTM system may comprise a network of UAS Service Suppliers (USS) that can communicate with UAV and with one another to avoid conflicts between UAV flights and provide other kinds of support for UAV operators.

During the course of a UAV flight, an established communication link between a UAV and a USS may become unreliable or unavailable. Degradation in the Quality of Service (QOS) such as low data rates or high latency by a PLMN may result in interruptions in communication between a UAV and a USS. For example, a USS may have limited-service availability in some areas or a USS may need to perform load balancing due to an increased UAV traffic management load. A USS may have reached its maximum capacity by serving the maximum permissible number of UAVs it may manage and thus cannot support adding another UAV. Further, UAV are not all alike. UAV may be used in many different ways, have different capabilities, different flight characteristics, different operating models and cost constraints. Not all USS may be equipped or suitable for a given UAV or UAV mission. Some USS may be more equipped/suitable than other USS for certain UAV missions and/or UAV types, or for UAV operations within particular geographical areas.

A UAV may experience a loss of performance capabilities due to instability in a communication link with a USS, or unavailability or unsuitability of a designated USS for communication with the UAV. Systems and methods are needed that support the ability of UAV to maintain reliable, robust and secure communications with a UTM or USS throughout its route. Embodiments of the invention provide such support by methods for handover of a UAV from a first USS to a second USS under contingencies or emergencies, as well as to maintain their operations within constraints, e.g., within approved concepts of operation.

Before a UAV can communicate with a UAV-C, the UAV and UAV-C must be paired. It is desirable to securely perform pairing authorization of a UAV and a UAV-C before establishing a C2 connection between them. An unauthorized pairing of UAV and UAV-C could pose serious risks to the security of a UAS and to public safety. PLMN implementing 3GPP standards can include network functions that support authentication and authorization by a USS/UTM of a UAV and UAV-C pairing before enabling a data connection between the UAV and UAVC. A 3GPP system may also provide network functions for a UTM/USS to revoke a UAV and UAV-C pairing authorization for the purpose of disconnecting a UAV from a UAVC. Methods according to embodiments of the invention leverage these PLMN functions and capabilities to support reliable, robust and secure communication between a UAV and UAVC.

Figure 2:
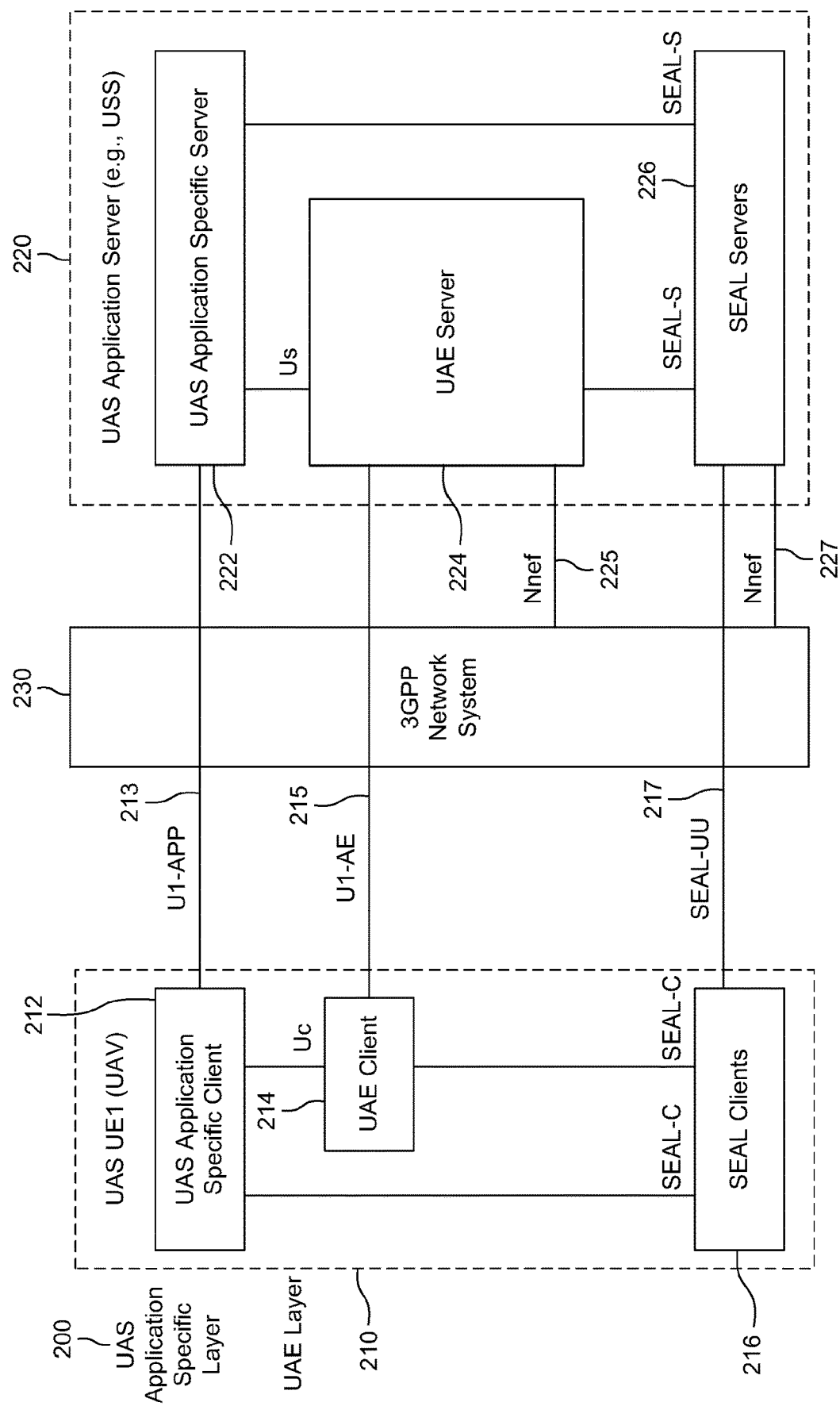
FIG. 2 a system diagram illustrating an example UAS application layer functional model.

FIG. 2 shows a simplified UAS application layer functional model 200 for providing support for UAV applications according to embodiments. A UAE layer 210 comprises a UAE client 214 that resides in the UE, and which may provide an API to a UAS client application 212 and interface with a UAE server 224 which provides an API to a UAS server application (e.g., USS) 222.

The UAS application server 220, also referred to herein as the USS, comprises the UAS application specific server 222, as UAS server 224 and one or more SEAL servers 226. The UAE layer may also include a Service Enabler Architecture Layer (SEAL) client 216. UAE server 224 may also interface with the 3GPP network system 230 directly via Network Exposure Function (NEF) API 225 or via SEAL services 227. The UAS Application Specific Client 212 communicates with the UAS Application Specific Server via interface UA-APP 213. The UAE Client 214 communicates with the UAE Server 224 via interface U1-AE 215. The SEAL Clients communicate with the SEAL Servers via interface SEAL-UU 217.

Figure 3:
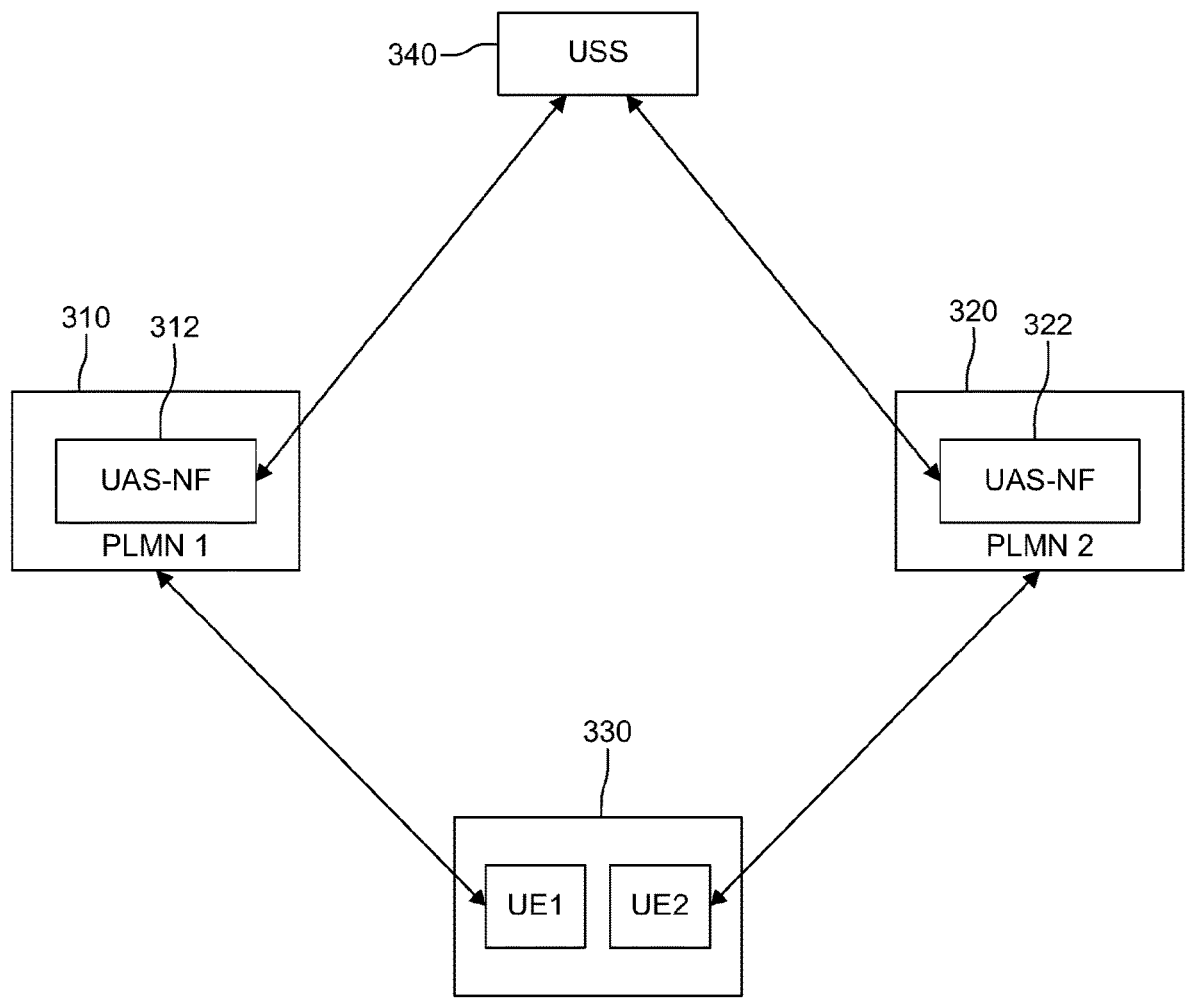
FIG. 3 is a high-level block diagram of a system for implementing embodiments.

FIG. 3 is a high-level block diagram of a system including multiple public land mobile networks (PLMN) for implementing embodiments of the invention described and disclosed herein. The system includes at least first a PLMN 310 and a second PLMN 320. Each of PLMN 310 and 320 can have a 5G Core Service Based Architecture (SBA). Each of PLMN 310 and 320 can communicate with a UAV 330. UAV 330 is equipped with first user equipment (UE) 332 and second UE 334. PLMN 310 and 320 each include first 312 and second 322 UAS network functions (UAS-NF) for communicating with a USS or UTM 340.

Figure 4:
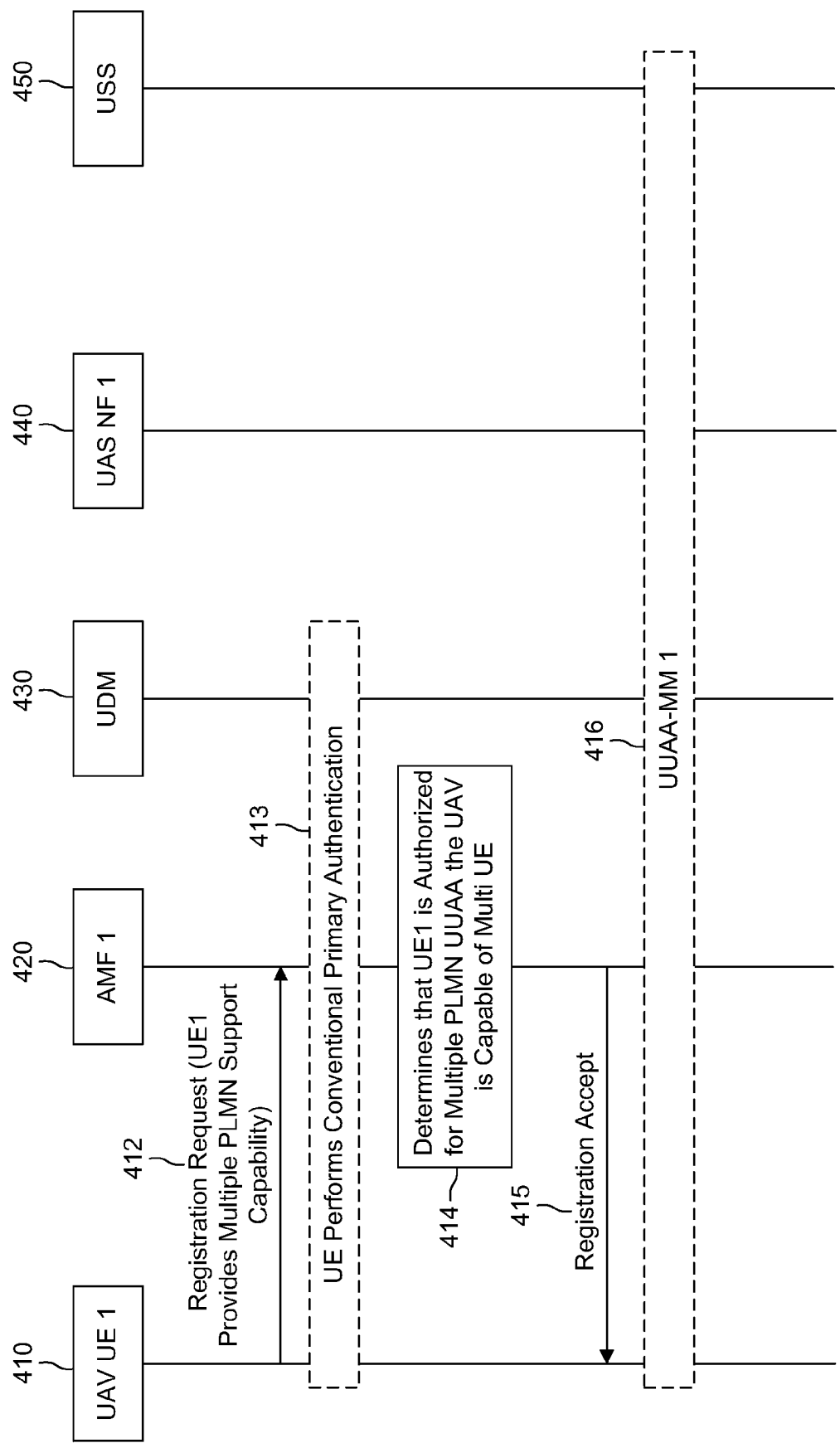
FIG. 4 illustrates actions for registering a first user equipment (UE) of an uncrewed aerial vehicle (UAV) having capability to support communication via more than one public land mobile network (PLMN) for communication with a UAV support service (USS) according to embodiments implemented in a system as illustrated in FIG. 3.

FIG. 4 illustrates actions for registering a UAV according to embodiments implemented in a system as illustrated in FIG. 3.

At action 412, UE1 410 of a UAV transmits to AMF1 420 of a first PLMN (not shown), a registration request. The registration request includes an indication that UE1 is equipped to communicate over more than one PLMN. In some embodiments, UE1 410 sends a registration request message as well as a CAA-level UAV ID along with indication of support for multiple PLMN connectivity capabilities (e.g., part of MUSIM capabilities or more application-specific e.g., multiple PLMN connectivity for redundant application connectivity).

In some embodiments one or more UE of a UAV includes a processor configured to provide functionality for one or more UE of a UAV such as capability to perform network registration functions. For example, in some embodiments a processor is configured to confer capability on one or more UE to transmit formatted network registration request messages and to receive formatted messages from networks in response to or in support of network registration requests. In some embodiments the processor is configured to include in such transmissions, indications of UE capabilities, e.g., capability for transmission via more than one PLMN and/or more than one channel of a PLMN.

In one embodiment, first UE performs a primary authentication procedure if the first UE is not yet authenticated. For example, at action 413 UE1 410 communicates with a AMF1 420 of the first PLMN to perform a conventional primary authentication procedure with a 3GPP Authentication Function (AUSF, not shown in the figure) and Unified Data Management (UDM) 430 to authenticate UE1 to the first PLMN.

At action 414, AMF1 420 processes the registration request. In some embodiments AMF1 420 performs actions to verify that the UAV is authorized for multiple PLMN support (e.g., UUAA across multiple PLMNs) based on a UE subscription. As a result of the processing AMF1 can determine at action 3 that UE1 410 is authorized for communication with a plurality of PLMN to perform UUAA procedures with the plurality of PLMN, and that the UAV is equipped with more than one UE.

At action 415, AMF1 transmits an indication of grant of the registration request of UE1. For example, in case UE 1 is authorized for multiple PLMN support, AMF1 sends a Registration Accept 414 with a pending UUAA indication. If multiple PLMN support is not authorized, the AMF may send the Registration Accept but include an indication that multiple PLMN is not authorized. In that scenario, the UE may refrain from initiating a UUAA with a second PLMN.

At action 416, UE1 performs a first UUAA procedure to authenticate the UAV with the USS. For example, in some embodiments AMF1 420 initiates and successfully completes the UUAA-MM procedure for the UAV and the AMF stores a successful UUAA result. The AMF updates the UE1 context such that UUAA is no longer pending and that the UE supports Multiple-PLMN connectivity.

In some embodiments the UE supports multi-USIM capabilities. In those embodiments the registration request message indicates the multi-USIM capabilities. In some embodiments the UE is already authorized for multi-PLMN communication to provide redundant application connectivity. In those embodiments, action 2 need not be performed.

Figure 5A:
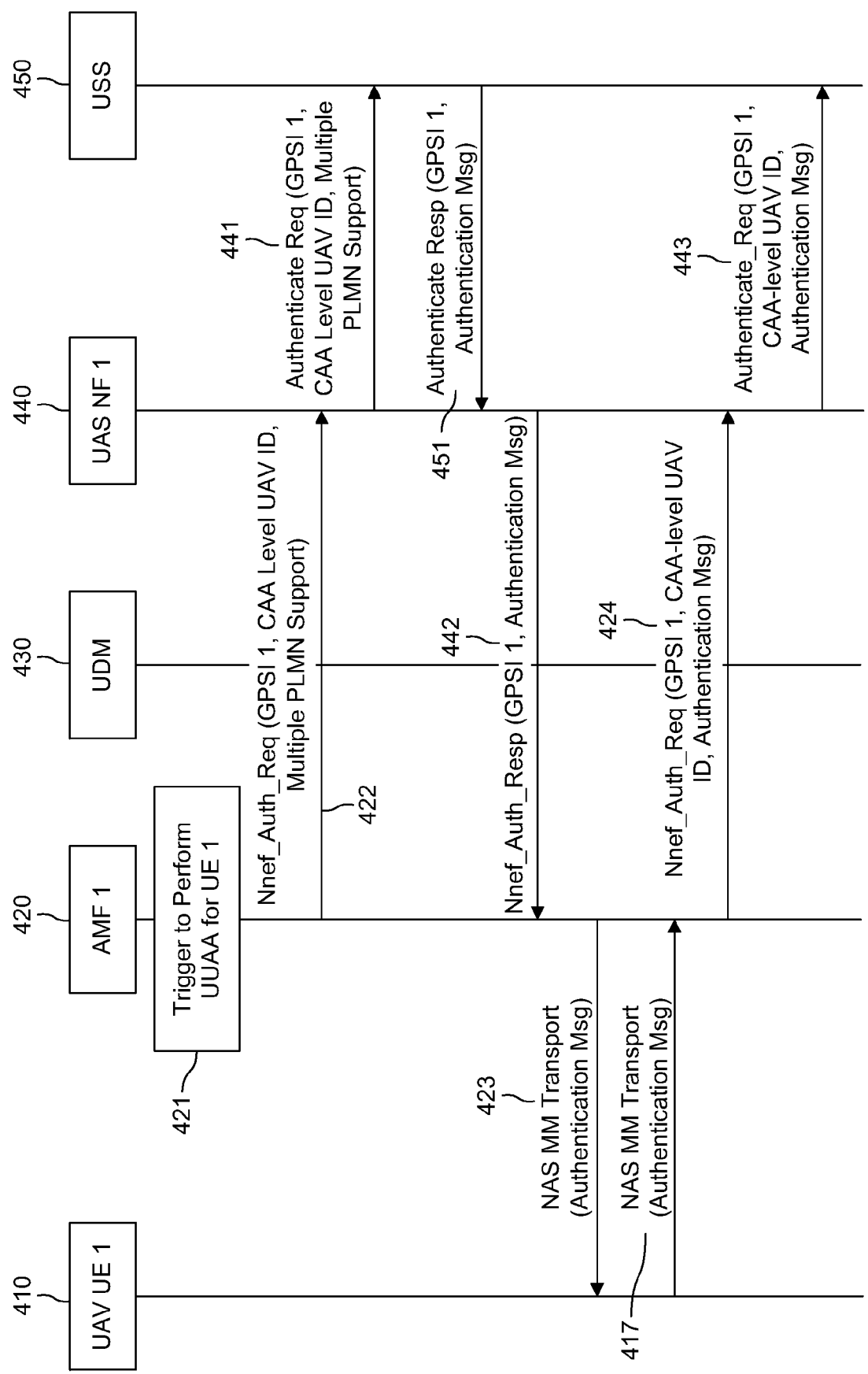
FIGS. 5A and 5B illustrate actions for authenticating and authorizing (AA) a first UE of a UAV to communicate with a USS by performing a USS-UAV Authorization-Authentication (UUAA) procedure according to embodiments.
Figure 5B:
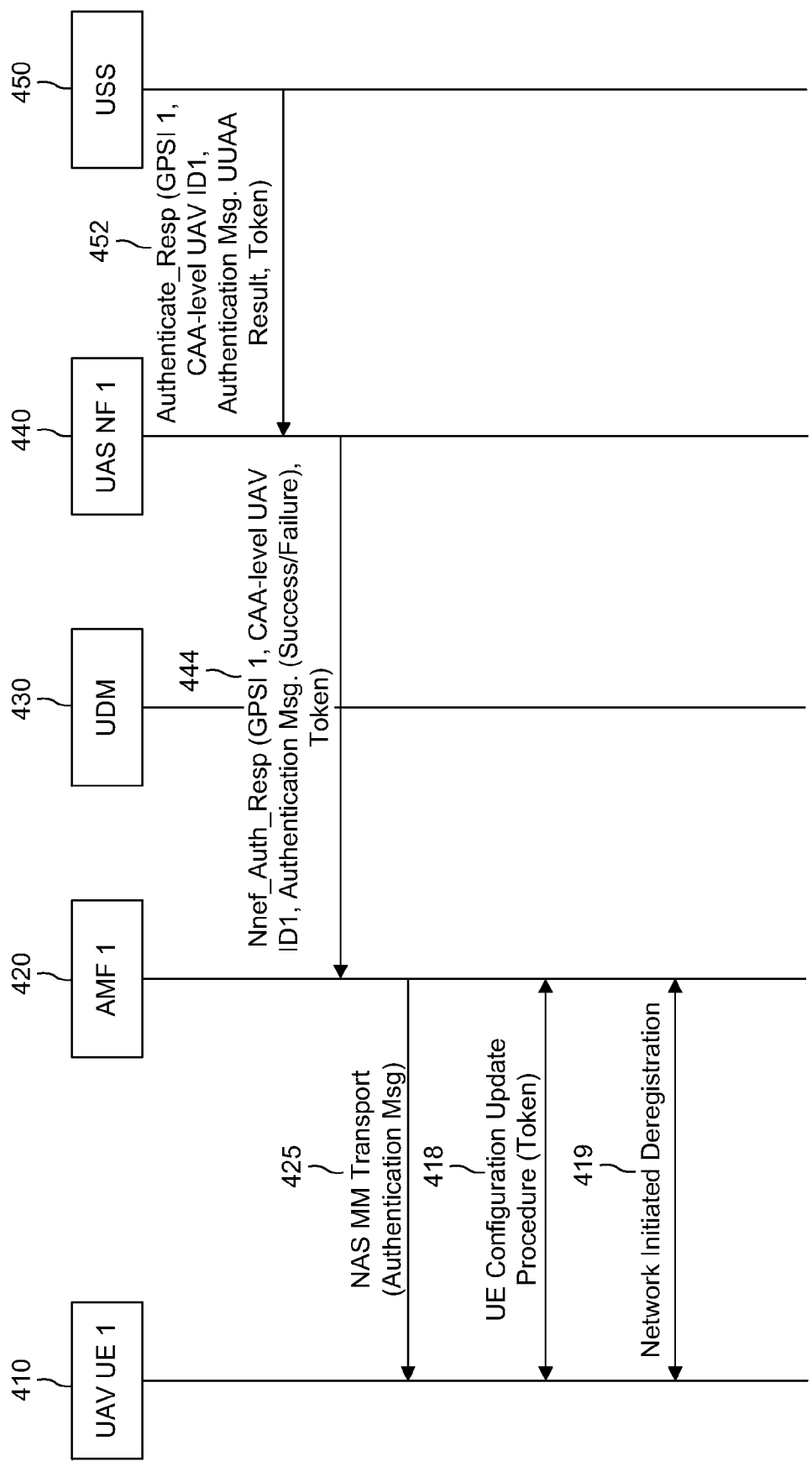

FIGS. 5A and 5B illustrate further actions to support switching UAV communication from a first PLMN to a second PLMN according to embodiments. Block number references 410, 420, 430, 440, and 450 are continued in this figure for consistency with FIG. 4. As noted above respect to FIG. 4, for a UE1 that requires UUAA, indication of support for multiple PLMN is forwarded. The AMF (AMF1 420) receives the request and in response triggers a UUAA-MM procedure as shown by action 1421.

At action 421 AMF1 420 responds to the registration request of UE1 410 by transmitting to UAS NF 1 440 of PLMN 1 a request for authentication of UE1 410 with USS, e.g., via a Nnref_Auth_Req 422 that indicates GPSI 1, CAA level UAV ID and also includes an indication that UE1 supports multiple PLMN. In some embodiments, AMF 1 sends a message 422 to UAS NF1 whereby AMF1 invokes Nnef_Auth_req service operation. The message includes the GPSI 1, CAA level UAV ID (e.g., UAV permanent id), and indication for multiple PLMN support.

At action 441, in response to receiving the authorization request, UAS NF1 440 transmits to USS 450 an authentication request, Authenticate Req, indicating GPSI 1, CAA level UAV ID and indicating UE1 support for multiple PLMN. The USS 450 receives and processes the authentication request. For example, UAS NF1 440 forwards the authentication request that includes the GPSI 1, CAA level UAV ID, multiple PLMN support to USS 450.

In some embodiments multiple authentication messages are exchanged back and forth between the UAV 410 and USS 450 in accordance with any requirements of the authentication method relied upon.

At action 451, the USS 450 transmits to UAS NF1 449 a response 'Authenticate Resp', indicating GPSI 1 and including an authentication message 'Authenticate Msg.'

At action 442, in response to the received authentication message, UAS NF1 440 transmits to AMF1 420 an authentication response, Nnef_Auth_Resp, indicating GPSI 1 and including the authentication message, Authentication Msg. For example, in some embodiments UAS NF1 440 forwards to AMF1 420, information received from the USS 450 in action 451.

At action 423, AMF1 420 transmits to UE1 410 an NAS MM Transport Authentication Msg. In some embodiments, the message provided by AMF1 is a final authentication message to UAV UE1 thereby providing a final authentication result to UE1 410.

At action 417 UE1 transmits the NAS MM Transport Authentication Msg to AMF1 420. At action 424, in response to the received NAS MM Transport Authentication Msg, AMF1 420 transmits to UAS NF1 440 an Nnef_Auth_Req message indicating GPSI 1, CAA-level UAV ID and including the Authentication Msg.

At action 443 UAS NF1 440 transmits to the USS 450 an Authenticate_Req message indicating GPSI 1, CAA-level UAV ID and including the Authentication Msg. This exemplary process continues on FIG. 5B as described below.

At action 452, the USS 450 transmits to UAS NF1 440 an Authenticate_Resp message indicating GPSI 1, a UUAA result (success/failure), authorized CAA-level UAV ID 1 (a new CAA-level UAV ID is assigned to the UE 1 from the USS), and a token (Token may be bound to any of GPSI 1, PLMN 1, CAA-level UAV ID).

At action 444, UAS NF1 440 transmits to AMF1 420 an Nnef_Auth_Resp message indicating GPSI, CAA-level UAV ID1 and including an Authentication Msg indicating authentication success or failure, and if successful, a token.

At action 425, In response to receiving the Nnef_Auth_Resp message, AMF1 420 transmits to UE1 410, a NAS MM Transport Authentication Msg.

At action 418, UE1 cooperates with AMF1 420 to perform a UE Configuration Update (UCU) Procedure based on the token AMF1 received from the USS via UAS NF1. For example, in one embodiment the token received from USS in previous actions is provided to the UE1 during a UCU procedure. The token confirms to UAV that the USS supports and has authorized usage of Multiple-PLMN connectivity. Based on receiving the token, the UAV may initiate UUAA via a second PLMN (PLMN 2) as described below with respect to FIG. 6.

At action 419, UE1 410 cooperates with AMF1 420 to perform a Network Initiated Deregistration in some embodiments of the invention.

In some embodiments, if a UUAA-MM fails during a Re-authentication and Re-authorization and there are PDU session(s) established using UAS services, and AMF 1 may trigger these PDU Sessions release with the appropriate cause value.

Figure 6:
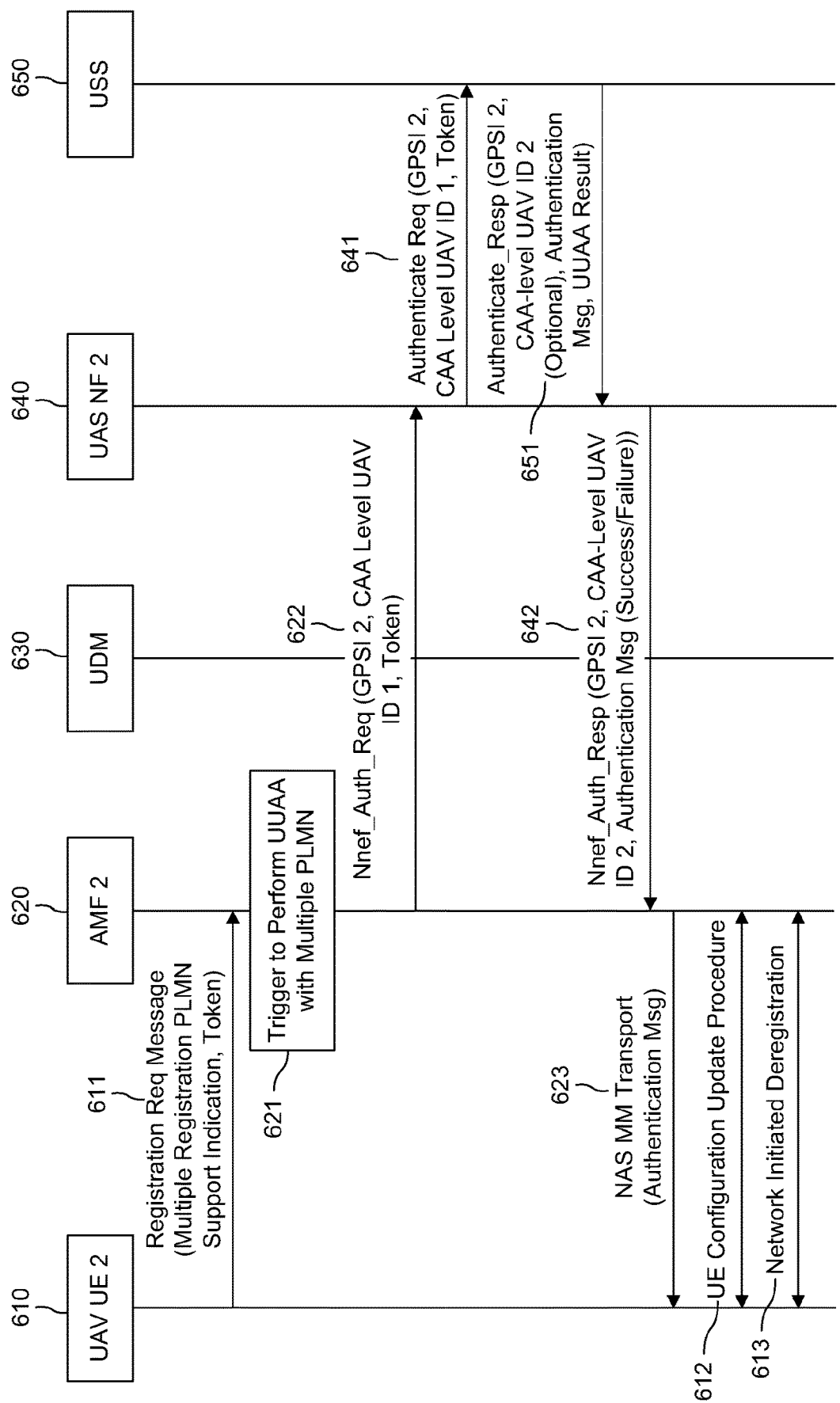
FIG. 6 illustrates actions of a registration and UUAA procedure by which a second UE of a UAV is authorized and authenticated for communication with USS according to embodiments.

FIG. 6 illustrates further actions for switching UAV communication from a first PLMN to a second PLMN according to embodiments. In a preliminary action 611, UE2 610 of UAV sends to AMF2 620 of PLMN 2 a registration request message including an indication of UE support for registration with multiple PLMN and including the token received via PLMN 1. For example, In some embodiments UE2 performs a procedure similar to that illustrated in FIG. 4 but includes a token that is previously received via PLMN 1 and multiple registration PLMN support indication.

At action 621, AMF2 620 is triggered to perform UUAA via the second PLMN (PLMN 2). In some embodiments, action 1 is performed after authorizing the registration whereupon the AMF 2 triggers a UUAA-MM procedure (with multiple PLMN support).

At action 622 AMF 2 transmits to UAS NF 2 640 of PLMN 2, an Nnef_Auth_Req message indicating GPSI 2, CAA level UAV ID 1 and including the above-described token.

At action 641 UAS NF2 640 transmits to USS an Authenticate Req message indicating GPSI 2, CAA level UAV ID 1 and including the token. In some embodiments UAS NF2 forwards the authentication request that includes the GPSI 2, CAA level UAV ID 1, and the token for multiple PLMN support. In some embodiments, using the token, the USS and UAV skip the multiple round trip authentication messages as for UUAA performed over PLMN 1 (FIG. 4).

At action 651, the USS 650 transmits to UAS NF2 640 an Authenticate_Resp message indicating GPSI 2 and optionally including CAA level UAV ID 2 and an Authentication Msg including the UUAA Result. In some embodiments, the USS 650 sends the authenticate_resp that includes GPSI 2, CAA level UAV ID 2 (which is optional in some embodiments), authentication msg, UUAA result. In some embodiments for privacy reasons, the USS 650 sends the optional new CAA level UAV ID 2 or alternatively may reuse the same CAA level UAV ID 1.

At action 642, UAS NF2 640 transmits to AMF2 620 a Nnef_Auth_Resp message indicating GPSI 2, CAA level UAV ID 2, and including an Authentication MSG indicating Success or Failure.

At action 623, AMF2 620 transmits to UE2 610 an NAS MM Transport Authentication Msg. In some embodiments, this is a final authentication message provided to UAV thereby providing a final authentication result.

At action 613, UE2 cooperates with AMF2 to perform a Network Initiated Deregistration. In some embodiments AMF2 triggers a UE Configuration Update procedure 612 to deliver to the UAV authorization information from USS in case of a successful UUAA MM procedure.

In some embodiments, if UUAA-MM fails during a Re-authentication and Re-authorization and there are PDU session(s) established using UAS services. AMF2 may trigger these PDU Sessions release with an appropriate cause value. In some embodiments the UUAA MM procedure for UE2 is optimized by use of the token, i.e., action 4 illustrated in FIG. 4 (multi-rounds of Authentication and authorization message exchange) may be avoided and the USS sends the Nnef_Auth_Resp which includes GPSI 2, and optional CAA level UAV ID 2, authentication message and UUAA result.

In some embodiments a UUAA SM Procedure for multi-PLMN is performed. In those embodiments the UUAA procedure is triggered by the SMF during the PDU Session Establishment where the multiple PLMNs are authorized by the USS. The SMF 1 needs to know about the UE multi-PLMN support capability in the PDU session request. Similar to UUAA MM, SMF 1 shares the multi-UE support information to UAS NF 1, which forwards it to the USS. In such embodiments, USS stores a mapping between CAA-Level UAV ID and UAV IP Address.

The UAS NF1 confirms the successful Authentication/Authorization of the PDU Session for UE1. Similar to UUAA MM, USS shares a token to the SMF 1 via an accept message during the UUAA SM procedure via UAS NF 1. The SMF 1 transfers the Authentication/Authorization result and forwards the token to UAV (e.g, in PDU Session Accept message). The token is shared with SMF 2 by UE2 and UAS NF2 triggers optimized Authentication/Authorization of the PDU Session for UE 2 by sharing the token to USS. The USS may verify that the token is associated with an authorized PLMN (PLMN 1) before granting authorization for UAV to use PLMN 2 in a response to UAS NF 2. The SMF 2 transfers the Authentication/Authorization result from UAS NF 2 to the UE 2.

The PDU session before the handover is configured to allow the communications of UE1 with USS while the C2 communication with the UE2 is standby/pending. In case of handover, there is PDU session modification request invoked, which allows the UAS NF 2 to retrieve the information of UE2 and the SMF 2 forwards the PDU session modification command to complete the pairing between the UE2 and UAV-C and enable the communication with the USS via secondary PLMN.

Figure 7:
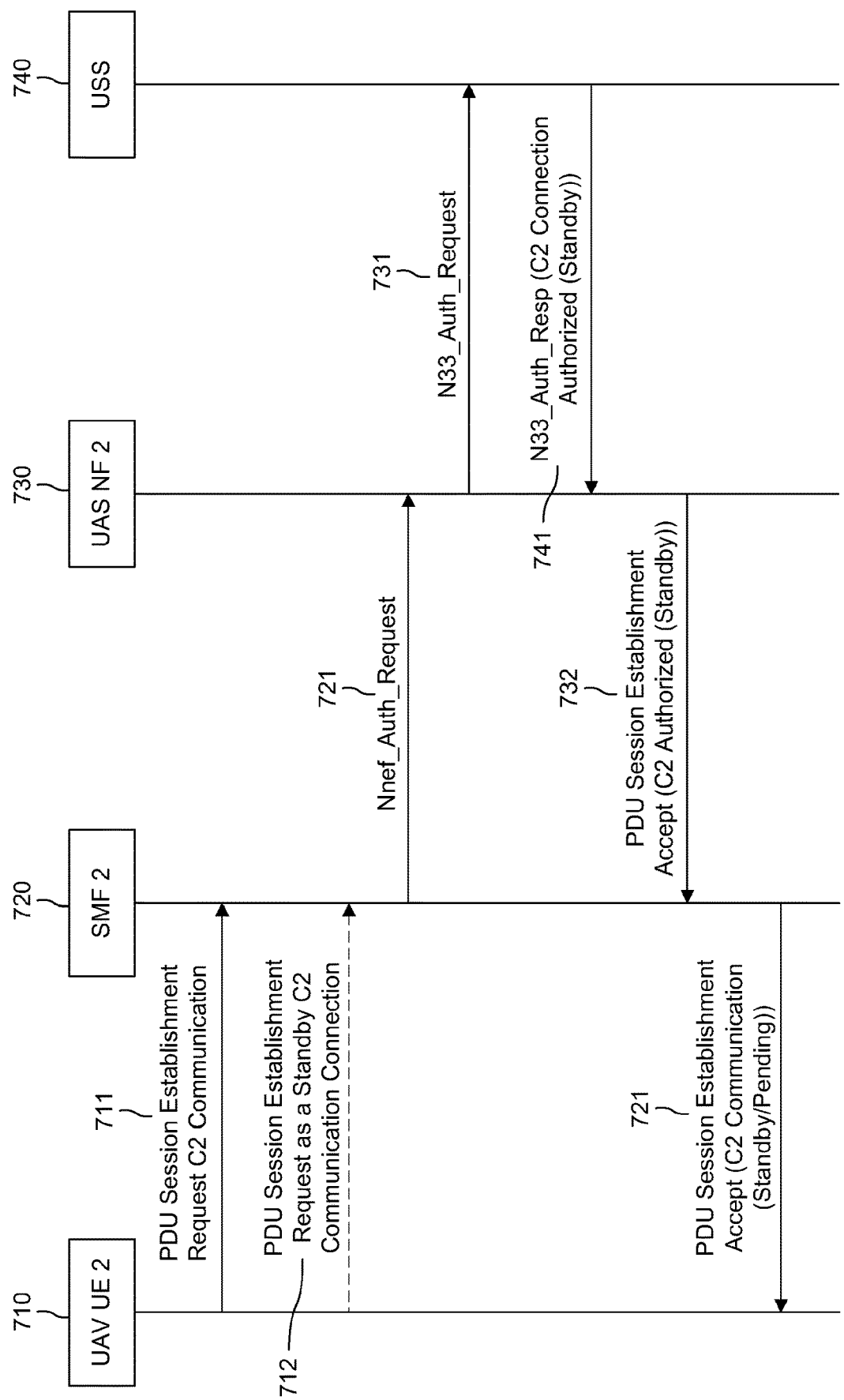
FIG. 7 illustrates actions for authorizing command and control (C2) communication between a second UE of a UAV and a USS via a second PLMN according to embodiments.

FIG. 7 illustrates actions for providing a UE2 710 to UAVC pairing in a pending or standby mode according to a method for switching UAV communication from a first PLMN to a second PLMN according to embodiments.

At action 71, UE2 of the UAV sends to SMF2 720 of PLMN 2, a Protocol Data Unit (PDU) session establishment request for C2 communication. In embodiments in which UE2 provides optional pairing info (UAV-C ID), the UAV-C ID is same UAV-C ID as that provided for UE1.

In some embodiments, alternative action 712 is performed. In such embodiments, at action 1b UE2 710 explicitly indicates to SMF2 720 that the PDU session establishment request is for a standby C2 communication connection, e.g., using awareness of existing C2 connection over PLMN 1.

At action 721, SMF2 720 sends to UAS NF2 730, an Nnef_Auth_Request message. For example, SMF2 forwards the request for the authorization of C2 connection.

At action 731, UAS NF2 730 sends to the USS 740 a N33_Auth_Request message. In some embodiments, UAS NF2 730 forwards the information received from SMF 2 720 including an indication for standby connection if provided.

At action 741, in response to processing the received N33_Auth_Request message, the USS 740 sends to UAS NF2 730 an N33_Auth_Resp message indicating authorization of C2 connection in a standby mode. In some embodiments the USS partially authorizes C2, i.e., by an indication that the C2 connection is authorized (e.g., partially authorized, authorization is pending/on standby), yet no actual pairing with UAV-C is authorized yet (e.g., UAV-C IP address is not provided.configured for the PDU Session) and that the connection is a "standby" connection for C2.

At action 732, UAS NF2 730 sends to SMF2 720 an indication of acceptance of establishment of a PDU session including an indication of authorization for C2 communications in standby mode. For example in some embodiments the UAS NF2 forwards the indication about the partially authorized C2 connection In the PDU session establishment accept.

At action 721, SMF2 720 sends to UE2 710 a PDU session establishment accept message 721 indicating authorization for C2 communication in standby/pending mode. In some embodiments UE2 710 has received an indication of connection for C2 as standby. Thus, UE2 710 refrains from using a PDU Session marked as "standby" until it becomes active following PDU Session modification i.e., pairing is authorized as described below.

Figure 8:
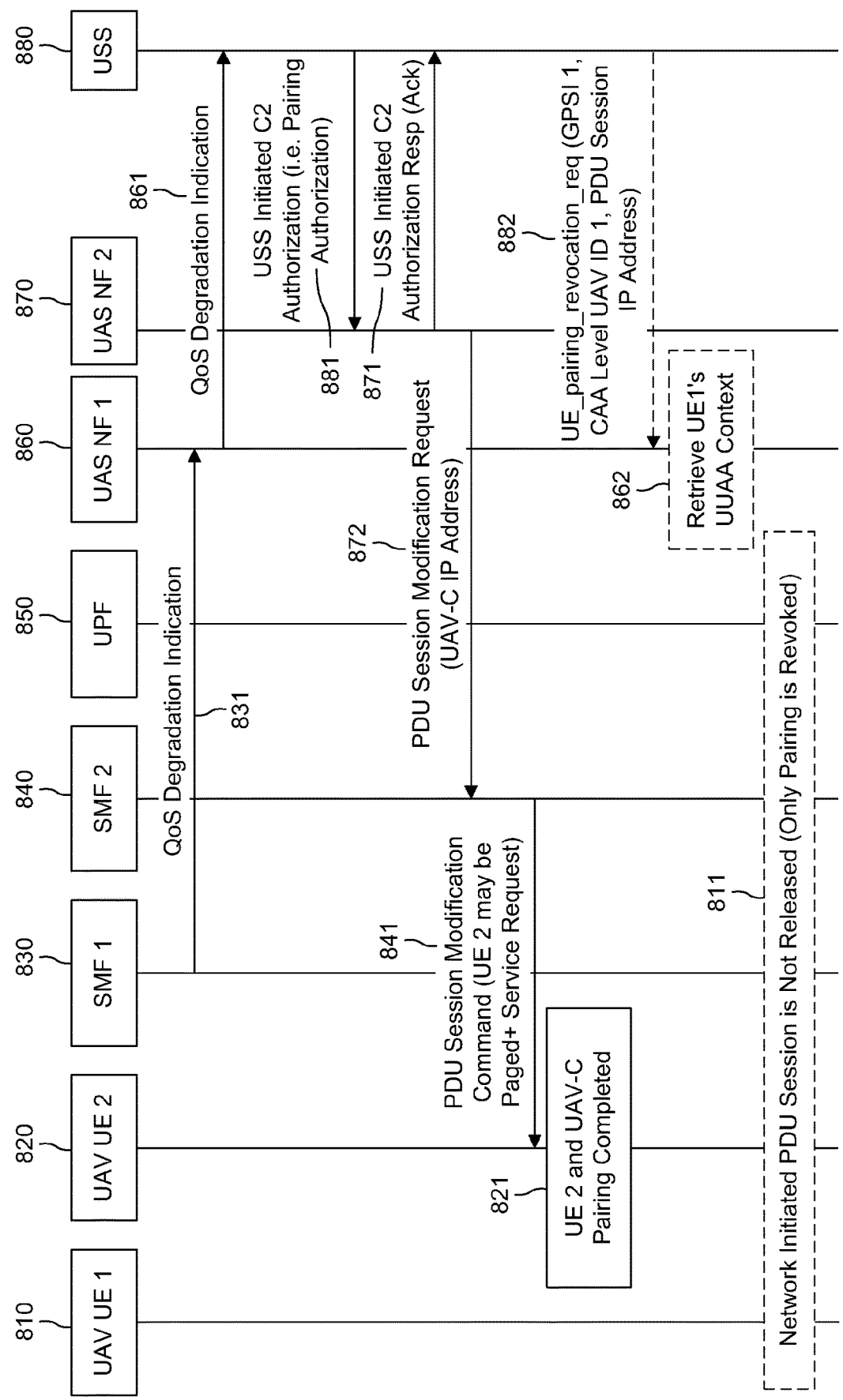
FIG. 8 illustrates further actions for pairing second UE of a UAV with a UAV controller (UAV-C) for switching a UAV C2 communication session from a first PLMN to a second PLMN according to embodiments.

FIG. 8 illustrates actions for UE2 and UAV-C pairing authorization in a method for switching UAV communication from a first PLMN to a second PLMN according to embodiments.

At action 831 SMF1 830 of PLMN 1 sends to UAS NF1 869, a QoS degradation indication. This is a network-initiated QoS degradation indication sent to UAS NF1 to send a handover request to the USS 880.

At action 861, in response to receiving the QoS degradation indication, UAS NF1 860 sends the QoS Degradation Indication to the USS 880. For example in one embodiment UAS NF1 forwards the indication received in action 1.

At action 881, and upon processing the indication, the USS 880 sends to UAS NF2 870 a USS-initiated pairing authorization for C2 communication. In one embodiment, this action is performed after the handover process triggers USS initiated C2 authorization (i.e., pairing authorization) to activate the standby PDU Session.

In some embodiments (action 871) UAS NF2 sends to USS a response in the form of an ack message after activation of a PDU session modification procedure to notify USS that the PDU session modification procedure is activated.

At action 872, UAS NF2 870 sends to SMF2 840 a PDU Session Modification request indicating UAVC IP address.

At action 841, SMF2 840 sends to UE2 820 a PDU Session Modification Command, which may be accomplished by paging UE2 820 with a paged+service request. For example in some embodiments, prior to the PDU Session modification, UE2 820 may be paged followed by a service request procedure (if MUSIM is used the paging cause may be leveraged to alert the UE about the activation of the PDU Session).

At action 821, pairing of UE2 820 with UAV-C is completed. In some embodiments the pairing between UE2 and UAV-C is completed upon completion of the PDU Session Modification procedure, after which UE2 can use the PDU Session over PLMN 2.

At action 882, the USS 880 sends to UAS NF2 870, a UE_pairing revocation indicating GPSI1, CAA level UAVID 1 and PDU session IP address. In some embodiments, on the UE1 side the USS 880 triggers a mirror action by unauthorizing the pairing configured for the PDU Session. In some embodiments the PDU Session used for the C2 connection is maintained but UE1 810 refrains from using it while using the PDU Session over PLMN 2.

At action 862, UAS NF1 retrieves UE1's UUAA stored context. Based analysis of the stored UUAA context UAS NF 1 can determine the target, either AMF 1 or SMF 1, for sending the notification to revoke the pairing.

At action 811 pairing authorization for UE1 and UAV-C is revoked. Note the Network-Initiated PDU session with UE1 is not released in embodiments of the invention. In some embodiments a revocation message includes an indication that only the pairing is revoked, not the connection itself (PDU Session is not released, e.g., that PDU Session may be marked as "standby", "partially authorized").

The methods including the actions illustrated and described above effect a secure transfer of UAV C2 communications with UAV-C via a first PLMN, to communication with UAV-C via a second PLMN (or in some embodiments a USS) in response to degraded QoS in the communication link provided by the first PLMN, thereby maintaining the capability of UAV to communicate throughout its route with UAV-C or a USS via robust, reliable and secure C2 communication links.

To provide reliable and uninterrupted in-flight UAS services, a single UAV flight mission may require support from multiple USS. The reason for multiple USS support stems from the fact that the UAV flight plan spans areas that are not controlled/covered by a single USS, as soon as the BVLOS UAV moves out of the coverage range of the serving USS it can have some connection issue (Qos degradation) and can no longer provide updates such as (Operation Volumes, flight path, deconfliction from other operations, etc.) or due to operation cost constraints.

For mission-critical services a particular USS may be unable to support such services in some particular areas. Another reason for the support for multiple USS is if the current serving USS becomes unavailable (e.g., outage), a failover mechanism is needed to mitigate any potential UAS operations disruptions caused by such USS failure. Hence, to avoid any communication interruption, handover from one USS to another is a viable solution. In such a scenario, a UAV and its controller (UAV-C) should be notified about the alternate USS. UAV needs to be authenticated and authorized by all relevant USSs and 3GPP network should be notified about the handover between the USSs, i.e., the backup USS has taken over services for the operation by primary USS (USS 1) as shown in FIG. 9, such that the location information can be communicated to the designated USS.

Figure 9:
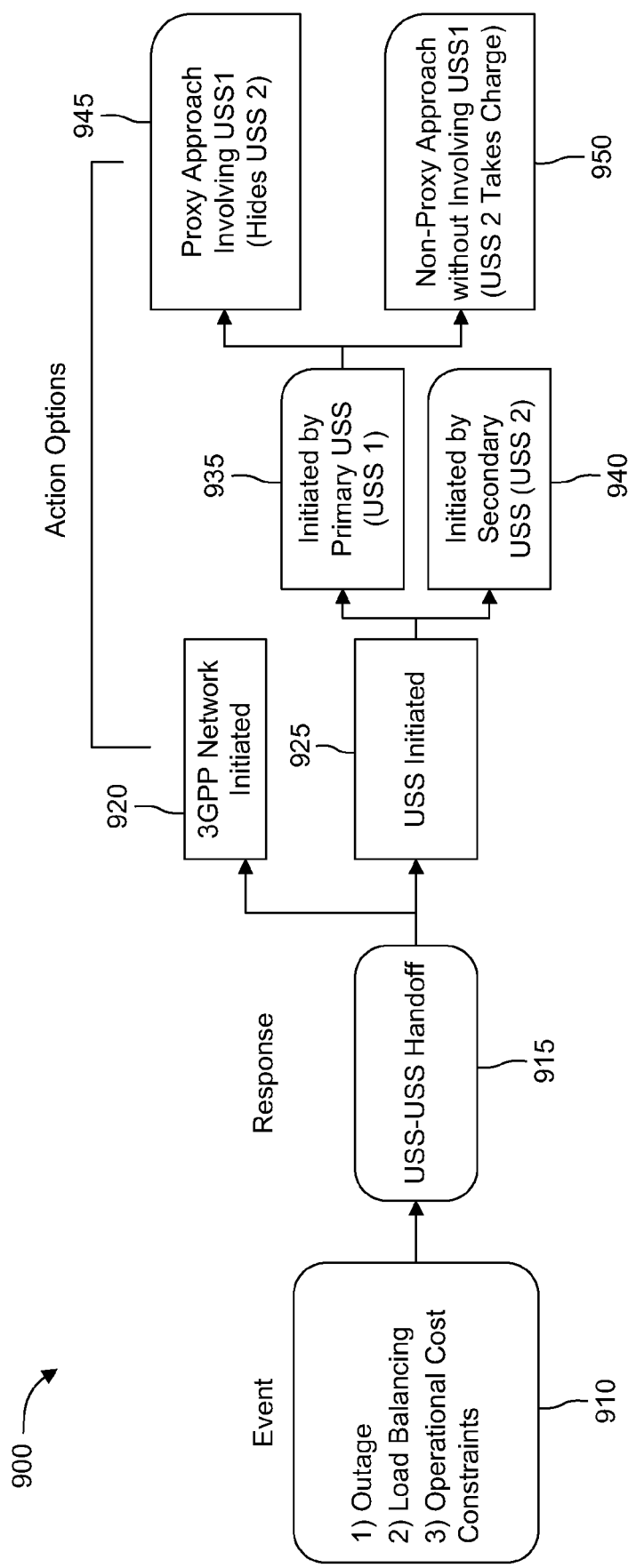
FIG. 9 is a high-level flow diagram illustrating actions for handing off a UAV from a first USS to a second USS according to embodiments.

FIG. 9 is a high-level flow diagram illustrating actions for handing off a UAV from a first USS to a second USS according to embodiments. At 910 an event impacting C2 communication between a UAV and a USS is detected, or an indication of such event is received. At 915 a USS-USS handoff is initiated in response to detecting the event or receiving the indication.

In one embodiment, at 920 a PLMN component initiates a handoff (handover). For example, a handover can be initiated by the 3GPP network when the serving/primary USS (named USS 1 herein) is not responding/experiencing communication issues. In that case, the 3GPP network can send the request to a serving/primary USS for the handover. In case the primary USS is unreachable by the 3GPP network, the 3GPP network may proactively contact a secondary USS (named USS 2 herein) using information about secondary USSs (e.g., as obtained from USS 1 during a prior UUAA procedure) to initiate the handover procedure with USS 2. When the USS 2 is notified about the handover request, the 3GPP network performs the appropriate actions to update the UAV connection to enable communication with USS 2. In some embodiments an update is conveyed over the control plane, PDU Session Modification procedure, and notification is provided to the UAV that there is new authorization data about USS 2.

In an alternative embodiment at 925 a USS initiates the handoff. For example, in some embodiments USS 1, after monitoring the disruption in communication services or for the load balancing, initiates the handover process when it determines that it can no longer continue to provide services to the UAS or it needs to perform load balancing. In some embodiments USS 1 is to fulfill some mission-critical constraints. In those embodiments USS 1 communicates with other available USSs and requests a switchover/handover. After the handover procedure is completed the 3GPP network is provided with two options: either keep sending the location updates to USS 1 which forwards the information to USS 2 (proxy approach) or send the location information directly to USS 2 (non-proxy approach).

In a proxy approach, following a change of USS, USS 1 may remain as the prime connection point with the 3GPP network for the location update information during the entire UAV flight and send the IP address of USS 2 to the network as the endpoint that will receive location information from the network. An enhanced location tracking provides different USS IP addresses, i.e., the IP address receiving the location information (USS 2) is different than the address where the request originated (USS 1) from the network. Hence, it is always the USS 1 that performs the subscription to service from the network for the location updates, but the network transparently sends the updates to the IP address that is specified (e.g., USS 2 IP address).

Thus, either a primary USS at 935 initiates the handoff or a secondary USS at 940 initiates the handoff. In embodiments in which a primary USS initiates the handoff, the primary USS may perform actions at 945 as a proxy for a secondary USS such that the identity/address of the secondary USS is not disclosed.

In some embodiments a handover is initiated by USS 2. For example, a handover initiation can be from a backup USS (USS 2 in FIG. 9) when, e.g., as a part of some health check process it sends periodic messages to the primary USS and as a response, it does not receive any acknowledgement from USS 1 due to failure. In that case USS 2 performs the handover and takes charge of the UAVs connected to the USS 1. USS 2 can follow the same procedure to inform the network and UAV of its IP address for location update as discussed for the non-proxy approach earlier. The network (UAS NF) may receive a request from USS 2 for location information about the UAVs served by USS 1 in a given area. The network may receive authorization information for USS 2 to perform such an operation. The authorization information (indicating USS 2 as an authorized alternative or backup USS) may be received from USS 1 during the UUAA procedure for the applicable UAVs. Alternatively, the authorization information may be received from USS 2 (e.g., as a token in the location request). The network returns a filtered list of UAVs identities and auxiliary information (e.g., GPSI, UAV ID, location) that are served by USS 1 to USS 2. USS 2 can then initiate the handover procedure for each of the applicable UAVs.

In an alternative embodiment, at 950 a secondary USS (USS2) initiates the handoff unilaterally, i.e., the primary USS is not involved in the handoff. In that embodiment, USS 1 informs the network about the IP address of USS 2, and it shares a token with the network to show that USS 2 is now authorized to serve the UAV after the handover, and as such, the location update information may be sent to USS 2. USS 2 may get the location from the network directly. In this approach, the UAV is informed of the new serving USS 2 via messaging through the network. For example, when the USS 2 takes over the traffic management service for the UAV it informs the UAV about its IP address either by involving the 3GPP network (e.g., NAS transport) or through the Application layer.

Handover can be initiated by the 3GPP network when the serving/primary USS (named USS 1 herein) is not responding/experiencing communication issues. The 3GPP network may send the request to the serving/primary USS for the handover. In case the primary USS is unreachable by the 3GPP network, the 3GPP network may proactively contact a secondary USS (named USS 2 herein) using information about secondary USSs (e.g., as obtained from USS 1 during a prior UUAA procedure) to initiate the handover procedure with USS 2. When the USS 2 is notified about the handover request, the 3GPP network performs the appropriate actions to update the UAV connection to enable communication with USS 2. There could be an update over the control plane, PDU Session Modification procedure, and notification to the UAV that there is new authorization data about USS 2.

Figure 10:
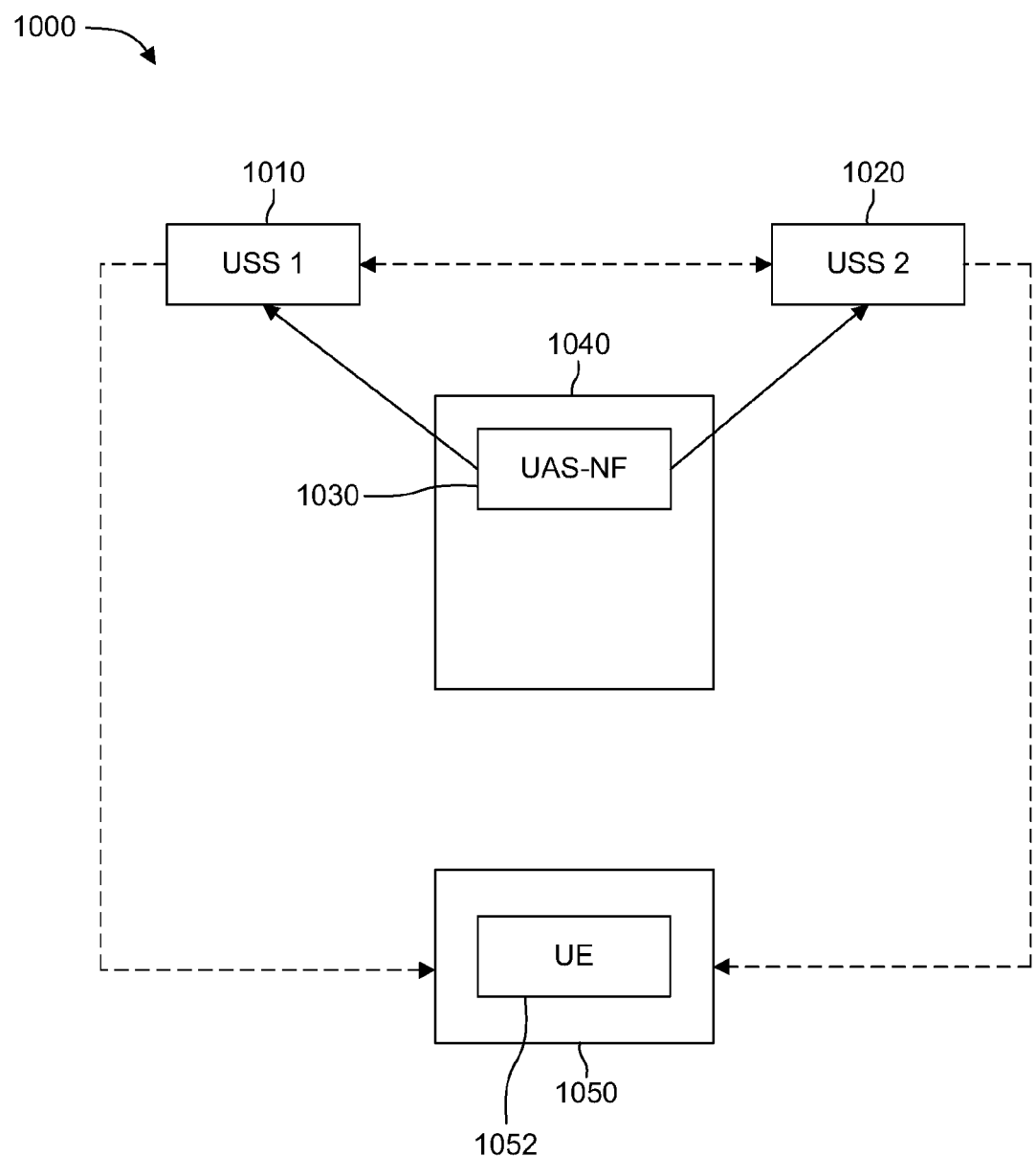
FIG. 10 is a block diagram illustrating an exemplary system for implementing embodiments.

FIG. 10 is a block diagram of a system 1000 for implementing embodiments. System 1000 includes a PLMN 1040 equipped with a UAS-NF component 1030. A UAV 1050 includes a UE 1052 configured for UAV communication with UAS-NF 1030 of PLMN 1040. The system includes at least a first USS 1010 and a second USS 1020.

The Figures below illustrate flow of method actions according to various embodiments of the invention. The method starts with the registration for multi-USS capable UAV, UUAA MM procedure followed by the handover between USSs and the procedure ends with the PDU session modification and reconfiguration.

Figure 11:
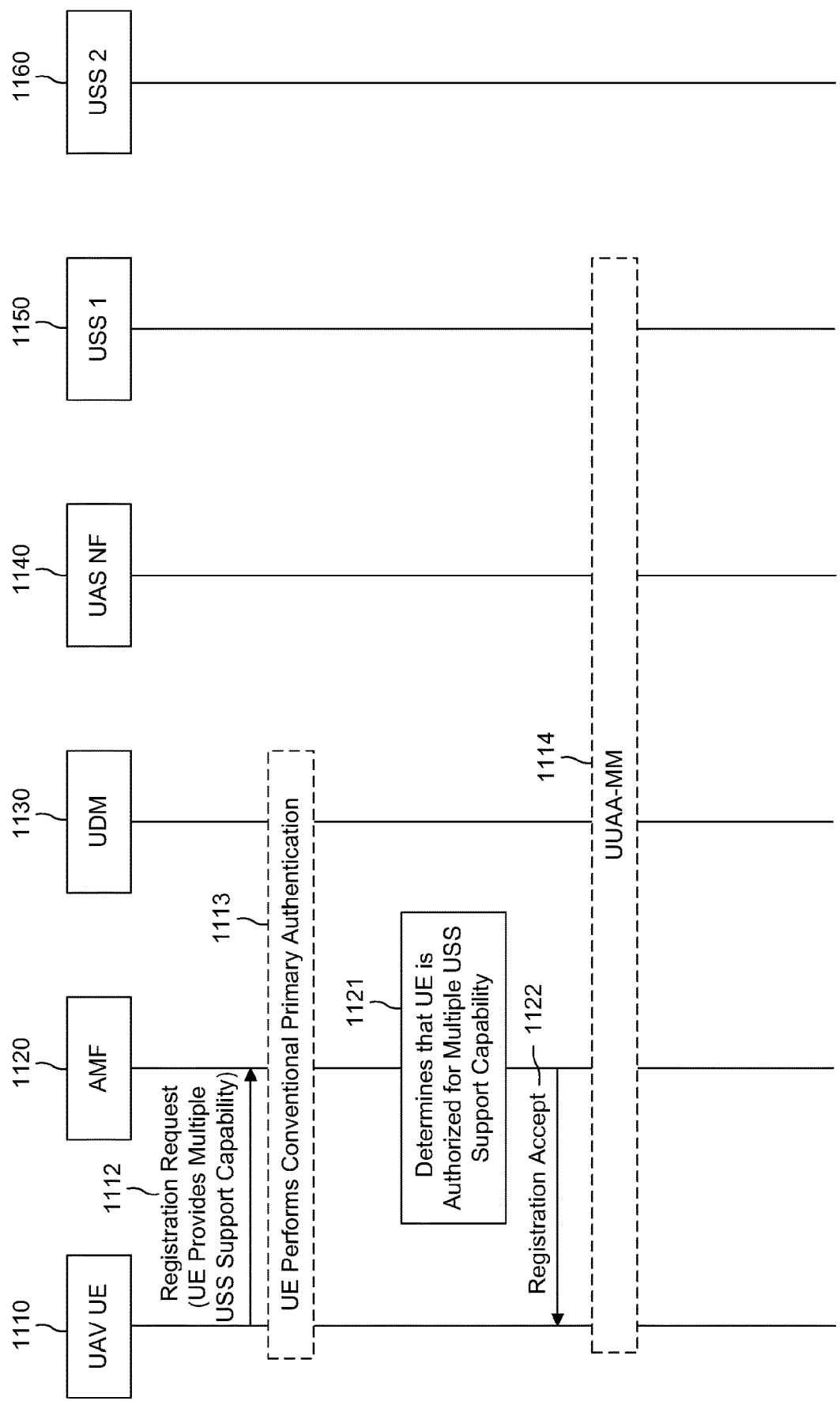
FIG. 11 is a detailed flow diagram illustrating actions for handing off a UAV from a first USS to a second USS according to embodiments.

FIG. 11 is a flow diagram illustrating registrations actions performed as part of a method for handing off UAV UE 1110 from first USS 1150 to second USS 1160 according to embodiments.

At action 1112, UE 1110 sends a Registration Request 1112 to a first AMF 1150 of a first PLMN. The registration request includes an indication the UE 1110 is equipped to support multiple USS. In some embodiments, the request message provides a CAA-level UAV ID along with the indication of support for multiple USS when registering for the UAS services.

At action 1113, UE 1110 cooperates with a UDM 1130 of the first PLMN to perform a primary authentication procedure. In some embodiments, the UE 1110 performs a conventional primary authentication if the UE is not already authenticated. AMF 1120 of the first PLMN processes the registration request.

At action 1121, AMF 1120 can determine that UE 1110 is authorized and equipped for communication with multiple USS. In some embodiments AMF 1120 verifies that the UAV is authorized for multiple USS support capabilities based on subscription information, and also determines whether UUAA MM is required.

At action 1122, AMF 1120 sends to UE 1110 an indication of AMF registration acceptance 1122.

At action 1114, UE 1110 cooperates with first USS 1140 to perform a UUAA-MM procedure as illustrated in FIG. 12. Once the UUAA-MM procedure (described below with respect to FIG. 12) is successfully completed for the UAV, the AMF 1120 stores a successful UUAA result and updates the UE context indicating that UUAA is no longer pending, UE capability to support multiple USS capability and with an optional authorized CAA-Level UAV ID received from the USS 1, and triggers a UE Configuration Update procedure to deliver the UUAA result and the UUAA Authorization Payload containing UAV configuration to the UE. In some embodiments, the AMF also delivers the authorized CAA-Level UAV ID that it received from the USS.

Figure 12A:
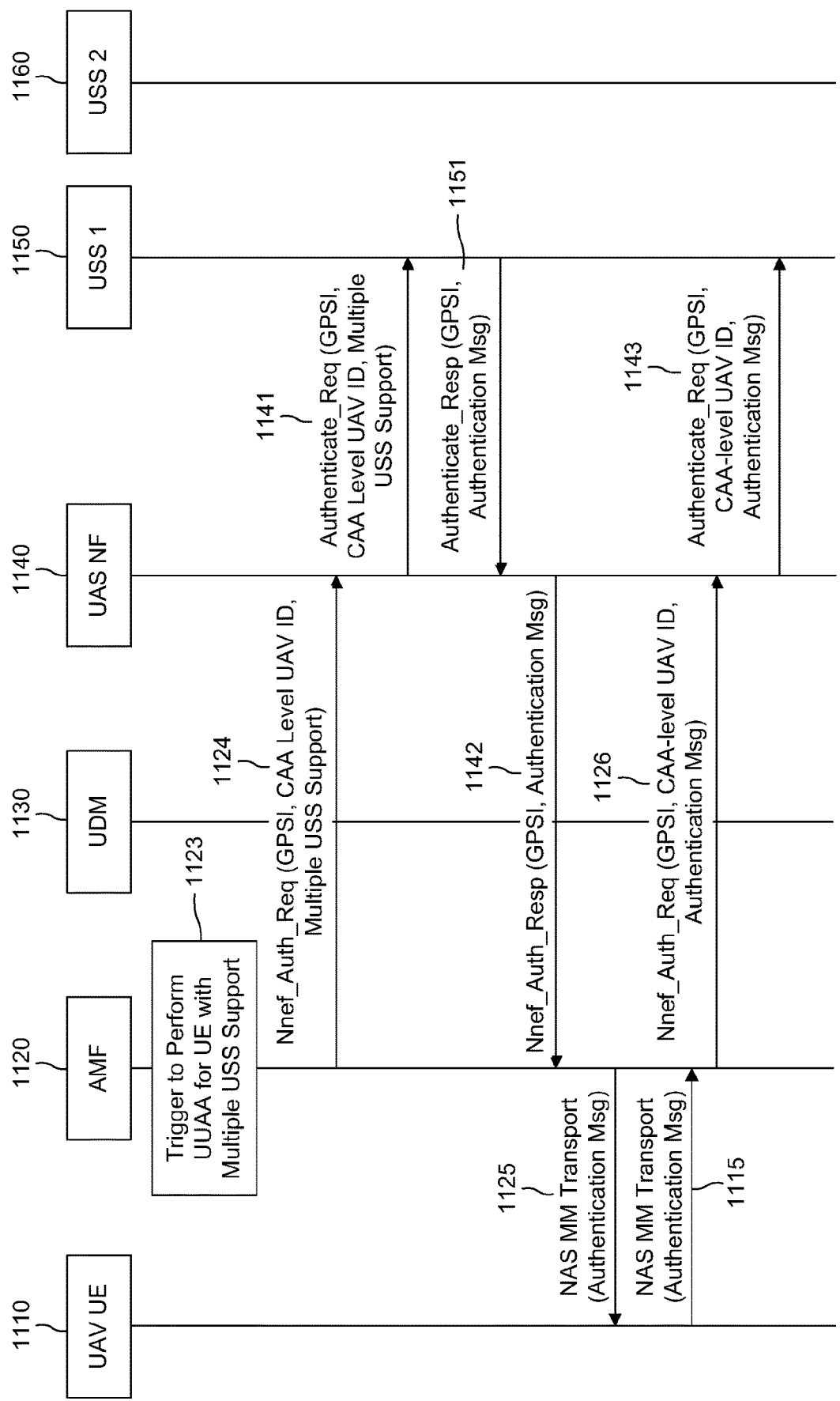
FIGS. 12A and 12B are a flow diagram illustrating further actions for handing off a UAV from a first USS to a second USS according to embodiments.
Figure 12B:
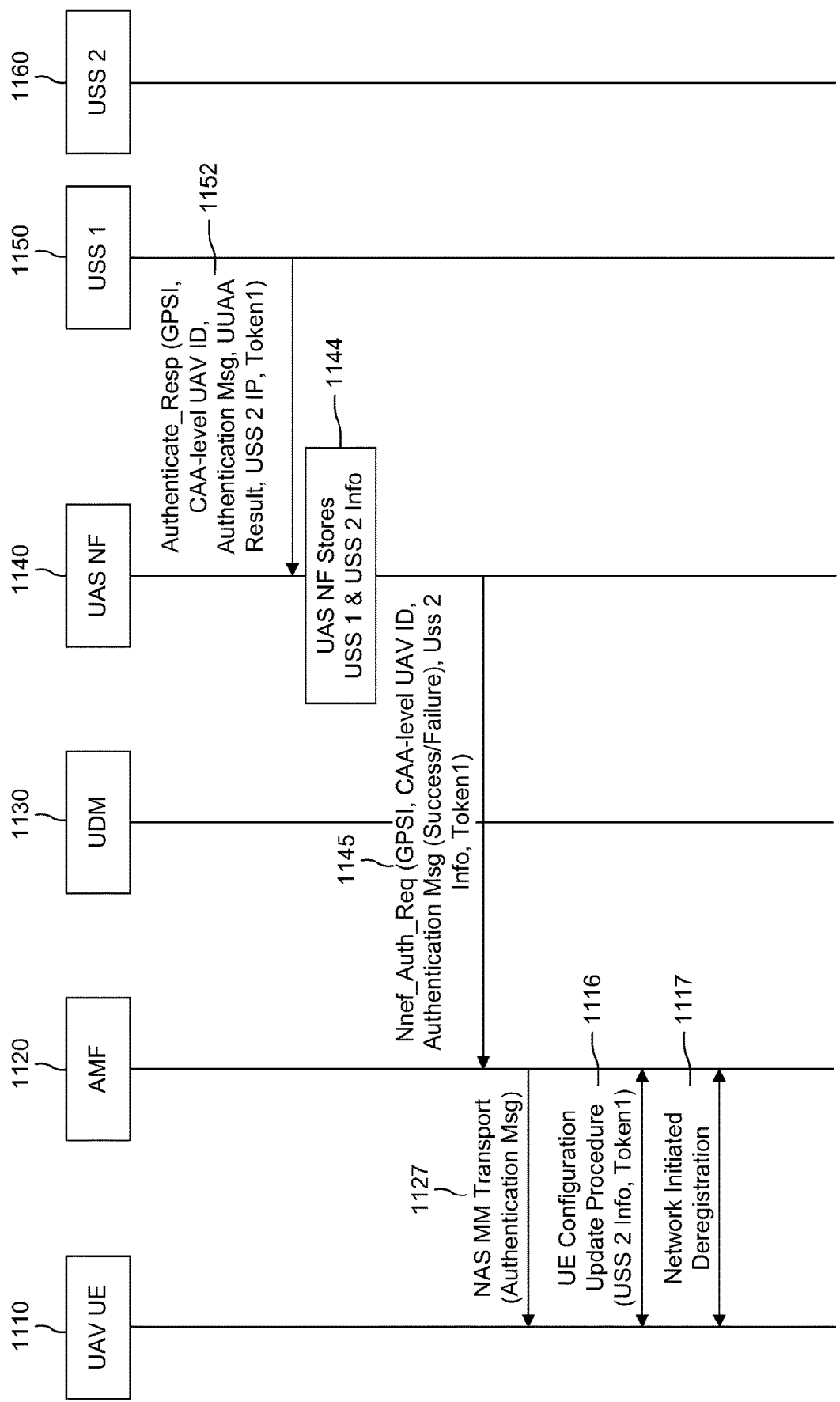

FIGS. 12A and 12B are a flow diagram illustrating further actions for handing off a UAV UE 1110 from a first USS 1150 to a second USS 1160 according to embodiments. Reference numbers for items 1110, 1120, 1130, 1140, 1150 and 1160 are carried over from FIG. 11 for consistency.

At action 1123, AMF 1120 is triggered to perform UUAA for UE 1110 with multiple USS support capability. In some embodiments, for a UE (capable of multi-USS support) that requires UUAA, the AMF triggers a UUAA-MM procedure.

At action 1124, AMF 1120 sends to UAS NF 1140 a Nnef_Auth_Req message indicating GPSI, CAA level UAV ID and indicating UE support for multiple USS. In some embodiments the AMF invoked Nnef_Auth_Req service operation that includes GPSI, the CAA-level UAV ID, and multi-USS support. UAS NF resolves the USS address based on CAA-level UAV ID or uses a UE-provided USS address.

At action 1141, UAS-NF 1140 sends to USS1 1150 an Authenticate_Req indicating GPSI, CAA level UAV ID and indicating UAV support for multiple USS. This message includes the GPSI, CAA-level UAV ID, and multi-USS support capability of the UAV.

At action 1151, USS1 1150 sends to UAS-NF 1140 an Authenticate Resp indicating GPSI, and including an Authentication Msg. In some embodiments this is a final Authentication Response that includes: GPSI, a UUAA result (success/failure), and may include an authorized CAA-level UAV ID. In some embodiments, USS1 provides other authorized USS(s) info (IP address) if known, along with the token. A final authentication message. UAS NF stores that info to enable any authorized USS to start query location of UAV before, during or after USS handoff.

At action 1142, UAS NF 1140 sends to AMF 1120 a Nnef_Auth_Resp indicating GPSI, and including an Authentication Msg. In some embodiments the Authentication Response forwards information received from USS in action 4a, along with authorized USSs info and token1.

At action 1125, AMF 1120 sends to UE 1110 a NAS MM Transport including Authentication Msg.

At action 1115, UE 1110 sends to AMF 1120 the NAS MM Transport Authentication Msg. In some embodiments this is a final authentication message which provides the final authentication result. Information about all the authorized USSs and token1 shared by USS1 is also provided to the UE 1110 (e.g., in a UCU procedure). In some embodiments if UUAA-MM fails during a Re-authentication and Re-authorization and there are PDU session(s) established using UAS services, AMF 1 may trigger these PDU Sessions release with the appropriate cause value.

In other embodiments the method continues with the actions discussed below.

At action 1126, AMF1120 sends to UAS NF 1140 a Nnef_Auth_Req indicating GPSI, CAA level UAV ID and including Authentication Msg.

At action 1143, UAS NF 1140 sends to USS1 1150 an Authenticate_Req indicating GPSI, CAA level UAV ID and including Authentication Msg.

At action 1152, (shown in FIG. 12B) USS1 1150 sends to UAS NF 1140 an Authenticate_Resp indicating GPSI, CAA level UAV-ID and including Authentication Msg and an indication of UUAA result as well as a USS 2 IP indicator and a first Token. At action 1144, UAS NF 1140 stores USS 1 and USS 2 information.

At action 1145, UAS NF 1140 sends to AMF 1120 a Nnef_Auth_Resp indicating GPSI, CAA level UAV ID and including Authentication Msg indicating authentication success or failure as well as USS 2 information and the first Token.

At action 1127, AMF 1120 sends to UE 1110 a NAS MM Transport Authentication Msg.

At action 1116, UE 1110 cooperates with AMF 1120 to perform a UE Configuration Update Procedure using USS 2 info and the first Token.

At action 1117, UE 1110 cooperates with AMF 1120 to perform a PLMN-initiated deregistration procedure with respect to USS1.

As discussed herein, UUAA MM procedures are performed such that multiple USSs are authorized by the 3GPP network. The UAS NF stores the information for the multiple USS. In the case of handover, changes in the UUAA SM procedure may be needed. The SMF needs to know about the UE multi-USS support capability in the PDU session request. Similar to UUAA MM, USS1 sends a token and USS2 information to the SMF in the accept message during the UUAA SM procedure with primary USS. This way, the SMF knows about the authorized USSs. The PDU session before the handover is configured to allow communication with USS1. In case of handover, there is a PDU Session Modification request which allows the SMF to retrieve the information of USS 2 and enable the communication with the secondary USS.

Once the token is shared with the UAS NF and all the way to the UAV along with the authorized USSs info, USS 2 can communicate with the network after the handover process as USS 1 sends handover notification to the network and receives an acknowledgment that now the USS2 can serve the UAV.

Figure 13:
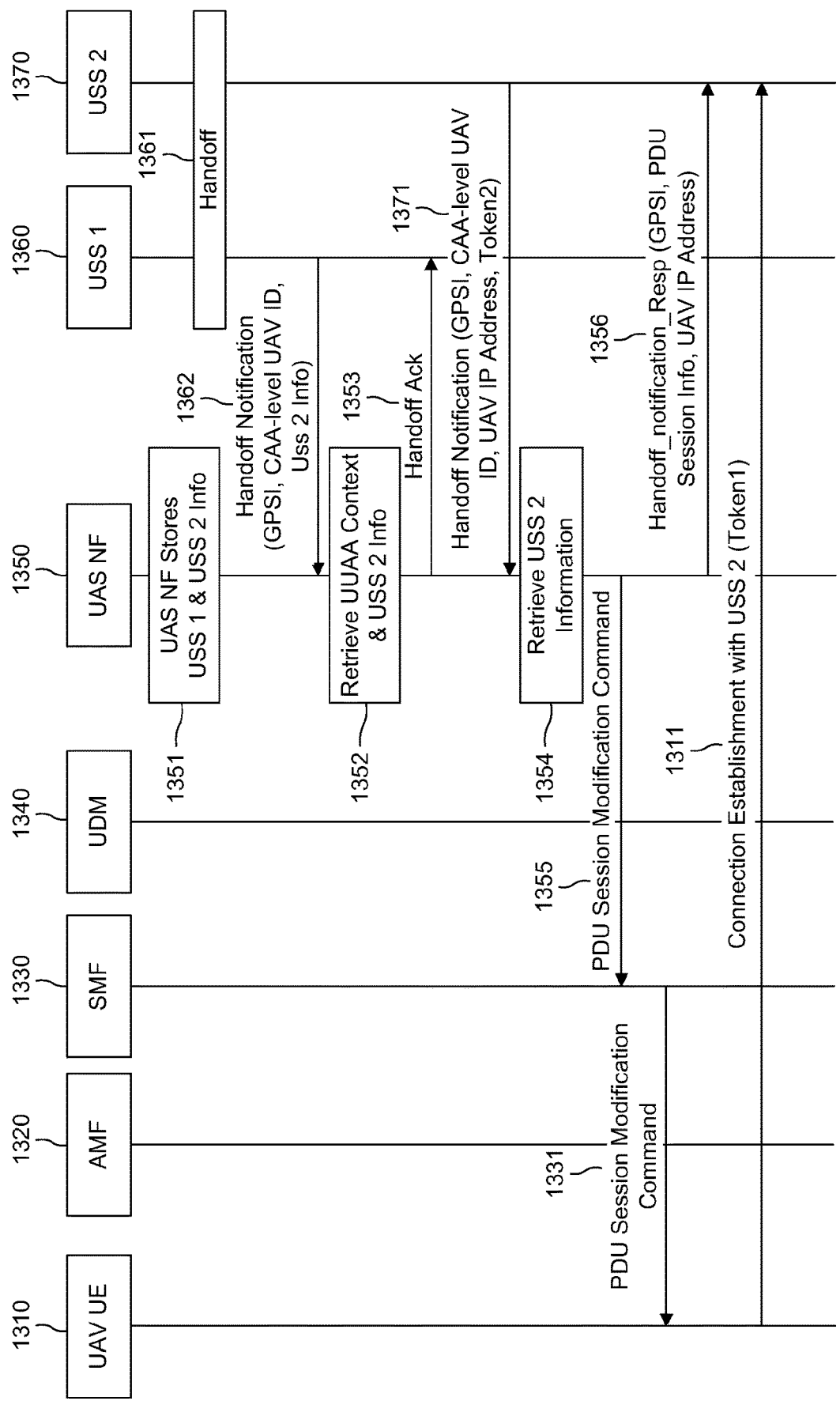
FIG. 13 is a flow diagram illustrating further actions for handing off a UAV from a first USS to a second USS according to embodiments.

FIG. 13 is a flow diagram illustrating further actions for handing off a UAV from a first USS 1360 to a second USS 1370 according to embodiments.

At action 1351, UAS NF 1350 stores USS1 1360 information as well as USS2 1370 information. UAS NF 1350 stores information about USS1 1360 and USS 2 1370, to enable the authorized USSs to start query location of the UAV before, during or after USS handoff.

At action 1361, USS1 1360 cooperates with USS2 1370 to effect handoff of the UAV from first USS1 to USS2. In some embodiments the handoff process may be initiated and related communication may take place between USS 1 and USS 2.

At action 1362, USS1 1360 sends to UAS NF 1350 a handoff notification including an indication of GPSI, CAA level UAV ID and USS2 1370 information. In one embodiment, after the successful handoff procedure USS1 1360 informs the UAS NF 1350 through the handoff notification msg that includes GPSI, CAA-level UAV id, and USS2 1370 information.

At action 1352, UAS NF 1350 retrieves a UUAA context and USS2 1370 information. As the UAS NF 1350 previously stored the information of all the authorized USSs provided by USS1 1360 during the UUAA MM procedure, it now retrieves the information.

At action 1353, UAS NF 1350 sends to USS1 1360 a handoff acknowledgement, Handoff ack. After action 4, UAS NF 1350 sends an acknowledgment to USS 1 1360 about the handoff and that it has the information of the updated USS for the UAV location update. In some embodiments, USS 1 1360 may forward the notification to USS 2 1370 to trigger action 6.

At action 1371, USS2 1370 sends to UAS NF 1350 a Handoff_notification including an indication of GPSI, CAA level UAV ID, UAV IP address and a second Token (token2). The USS2 info is provided if not already provided or to indicate which USS will take over (if one or more). The notification msg includes (GPSI, CAA-level UAV ID, UAV and token2). The UAS NF 1350 verifies any USS2 1370 info stored prior and the token to ensure that USS2 is now authorized to serve the UAV (e.g., communicate with UAV, receive location updates from the network).

At action 1354, UAS NF 1350 retrieves USS2 1300 information. In one embodiment, the UAS NF 1350 upon getting the handoff_notification msg, retrieves the information about the authorized USS2 information.

At action 1355, UAS NF 1350 sends to an SMF 1330 of PLMN 1 a PDU session modification command 1355. For example, the UAS NF 1350 triggers a PDU session modification procedure (e.g., via PCF) to authorize communication between the UAV and the new USS2 IP address. The SMF 1330 may configure UPF accordingly so as to only forward the traffic between UAV and the authorized USS2. As part of the PDU Modification command (NAS signaling) the new IP address of USS2 1370 can be forwarded to the UAV.

At action 1331, SMF 1330 sends to UE 1310 a PDU session modification command.

At action 1356, UAS NF 1350 sends to USS2 1370 a Handoff_notification_Resp including an indication of GPSI, PDU session information and UAV IP address. In some embodiments, the IP address is that of the PDU session used for USS communication (if a dedicated for C2 is used it is not impacted by this action).

At action 1311, UE 1310 sends to USS2 1370 an indication of connection establishment with USS2 1370 and including the first Token (token1). By using the updated USS information and Token1 shared with the UE, the UAV can prove that it is authorized to communicate with USS2 and the connection between the UAV and USS2 can be securely established.

Figure 14:
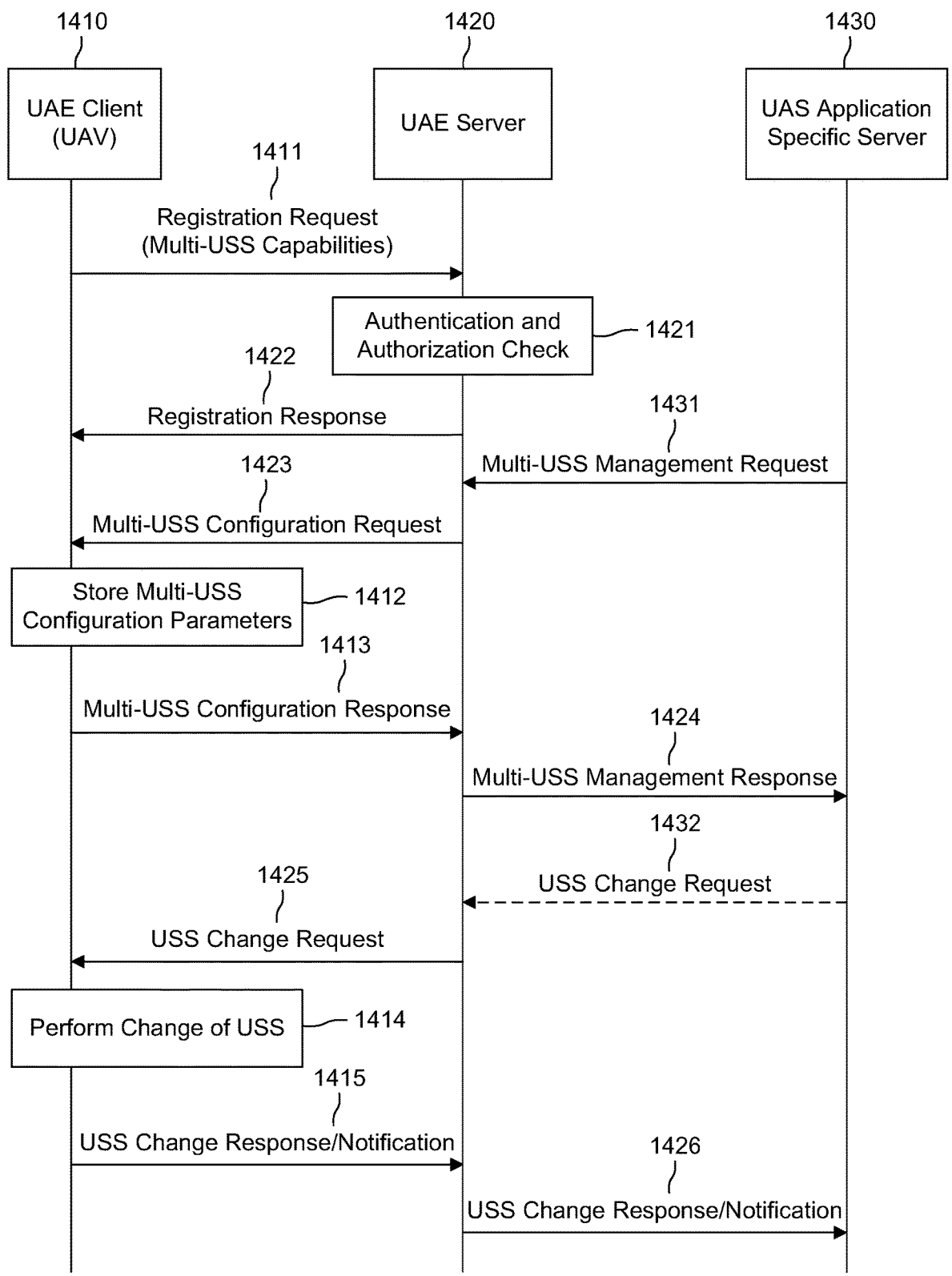
FIG. 14 illustrates example procedures for UAE support for multi-USS operations.

Support for multi-USS call flows is described herein. FIG. 14 illustrates example procedures for UAE support for multi-USS operations.

In FIG. 14 at action 1411, a UAE client 1410 sends a Registration request to a UAE Server 1420 including an indication of multi-USS capability.

At action 1421, the UAE server 1420 may perform authentication and authorization checks and may interact with the USS in the process and to indicate multi-USS capabilities and identification information of UAE client.

At action 1422, the UAE client 1410 may receive a Registration response from the UAE server 1420 with an indication of authorization for multi-USS support.

At action 1431, the UAE server 1420 may receive a multi-USS management request from a serving USS 1430 for managing the support for multi-USS. The request may include at least one of the UAV (UAE client) identification information and multi-USS configuration parameters. If the request is to add a configuration, the UAE server 1430 may store the configuration parameters associated with the USS in the UAE client context. If the request is to remove a configuration, the UAE server checks that the configuration is associated with the requesting USS before deleting the configuration from the UAE client context and sending a request to the UAE client.

At action 1423, the UAE client 1410 may receive a multi-USS configuration request from the UAE server 1420. The request may be to add or delete a multi-USS configuration.

At action 1412, if the request is to add (or delete) a configuration the UAE client 1410 may store (or delete) the configuration associated with the USS 1430. In case of removal of Multi-USS configuration, then UAE client 1410 may remove the configuration if the request is associated (e.g., include a USS identifier, FQDN of the USS) with a USS that matches the USS associated with (e.g., that "owns") the configuration.

At action 1413, the UAE client 1410 may send a multi-USS support configuration response to the UAE server 1420 to acknowledge addition/removal of the configuration.

At action 1424, the UAE server 1420 may send a multi-USS management response to the USS 1430 indicating enablement or disablement of multi-USS capability.

At action 1432, the UAE server 1420 may receive from the USS 1430 a multi-USS change request 1432 including at least one of UAV, new USS identification and authorization information. The UAE servers may also verify that the request is authorized as described above before sending a change request to the UAE client1410.

At action 1425, the UAE client 1410 may receive a multi-USS change request from the UAE server 1420.

At action 1414, the UAE client 1410 may perform change of USS based on a change request and/or a multi-USS configuration. The UAE layer may inform the application to initiate communication based on new USS information.

At action 1415, the UAE client 1410 may send to the UAE server 1420 a multi-USS change response/notification to indicate a change of USS. The UAE client may include in the notification message the new USS info, cause for USS change.

At action 1426, the UAE server 1420 may send to the USS 1430 a multi-USS change response/notification to indicate a change of USS. The UAE server may include in the notification message the new USS info, cause for USS change.

Table 1 illustrates an example of USS configuration that includes multi-USS parameters. For example, a consolidated USS configuration may include a multi-USS configuration component as well as other configuration components (e.g., C2 switching configuration).

TABLE 1

| Consolidated USS Configuration |
|---|
| USS Configuration |
| Home USS: |
| H-USS identity, Allowed S-USS list |
| Specific Secondary USS parameters: |
| S-USS_1 identity |
| S-USS-1 change-initiation flag, S-USS-1 change policy, |
| S-USS-1 C2 switching parameters |

TABLE 1-continued

Consolidated USS Configuration

S-USS_2 identity
S-USS-2 change-initiation flag, S-USS-2 change policy,
S-USS-1 C2 switching parameters
S-USS_n identity
S-USS-n change-initiation flag, S-USS-n change policy,
S-USS-n C2 switching parameters UAVs of different types may be associated with different USSs and thereby be given different capabilities in a particular Home USS (For example in this manner IoT devices communicate over a dedicated RAT). The Home USS is the USS that "owns" the configuration for a particular UAV (i.e., the USS that is allowed to add/delete/modify the configuration). The Home USS may correspond to the entity that holds the UAV subscription and/or that performs the UAV authentication and authorization procedure. The UAE layer ensures that operations on the USS configuration may be done on the condition that the requesting USS owns the USS configuration.

All UAVs that belong to a particular USS (Home USS), may have particular secondary USSes (part of Allowed USS list), and the configuration (change-initiation flag, the change policy and the C2 switching parameters) may be set per secondary USS for all UAVs that have this USS as home USS.

An alternative multi-USS configuration is illustrated in Table 2, depicting exemplary USS change Policy Rules.

TABLE 2

USS Configuration with exemplary USS change policy template

USS Configuration
Home USS:
Home USS identity
Allowed S-USS list
USS Change Policy (set of Rules):
Initiation Rule:= <USS id> => <flag value = true|false>
Change USS Rule:= <USS id>[:<time>:
<location>:<condition X>... ] => <new USS id>

The USS Change Policy may comprise a list of rules. The Initiation Rule may indicates whether UAE initiated USS change is authorized for a given USS. The Change USS rule may indicate the conditions/criteria for a change of USS to take place and the target USS to be selected when such conditions/criteria are met.

For example, initiating a USS change may be allowed by USS-1 but not for any other USS.
In such a scenario Initiation Rules that may be set as:
  Initiation Rule: USS-1=>true
  Initiation Rule (Catch-all rule):*=>false
In an example, changing from USS-1 to USS-2 may triggered when UAV enters a given areaX:
  Change USS Rule: USS-1:location:areaX=>USS-2
In another example, changing from USS-1 to any USS may be triggered in an emergency situation such as due to the loss of connection with USS-1:
  Change USS Rule (Emergency): USS-1: event:connection loss=>"Any Allowed USS"

The methods including the actions illustrated and described above effect a secure transfer of a UAV from a first USS to a second USS, thereby maintaining the capability of UAV to maintain robust, reliable and secure C2 communication links throughout its route. Accordingly, the invention provides for secure and reliable command and control of in-flight uncrewed aerial vehicles via public land mobile networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a non-transitory computer-readable medium for execution by a computer or processor. Examples of computer-readable media include electronic signals (transmitted over wired or wireless connections) and non-transitory computer-readable storage media. Examples of non-transitory computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by a wireless transmit/receive unit (WTRU) including a UAV application enabling (UAE) client in an in-flight uncrewed aerial vehicle (UAV) for supporting multiple UAV system (UAS) Service Suppliers (multi-USS), the method comprising:
   sending a registration request to a UAE server, the registration request including an indication of multi-USS capability;
   receiving a registration response message;
   receiving a multi-USS configuration request that includes a multi-USS policy comprising an allowed USS;
   sending a multi-USS configuration response;
   performing a USS change; and
   sending a change notification based on the multi-USS policy, including a cause for change of USS.

2. The method of claim 1, wherein the USS change notification is further based on receiving a USS change request from a UAE server.

3. The method of claim 1, wherein the multi-USS configuration request is a request to delete a first USS configuration and the method further comprises removing the first USS configuration if the request to delete is associated with a USS that matches a USS associated with the UAE.

4. The method of claim 3, wherein the USS associated with the UAE holds a subscription for the UAV.

5. The method of claim 3, wherein the USS associated with the UAE previously authenticated and authorized the UAV.

6. The method of claim 1, wherein the multi-USS configuration request is a request to add a second USS configuration and the method further comprises storing the second USS configuration.

7. The method of claim 1, wherein the multi-USS policy includes a rule for initiating a USS change wherein only a first USS can initiate a change.

8. The method of claim 1, wherein the multi-USS policy includes a rule allowing any allowed USS to initiate a USS change when a connection is lost with a first USS.

9. The method of claim 1, wherein the conditions under which the UAE client initiates a USS change include the UAE client moving from a first geographic area associated with a first USS to a second geographic area associated with a second USS.

10. The method of claim 1, wherein the multi-USS policy further comprises a geographical area in which the allowed USS is active.

11. An uncrewed aerial vehicle (UAV), comprising:
a wireless transmit/receive unit (WTRU) including a UAV application enabling (UAE) client for supporting multiple UAV system (UAS) Service Suppliers (multi-USS), the WTRU configured to:
send a registration request to a UAE server, the registration request including an indication of multi-USS capability;
receive a registration response message;
receive a multi-USS configuration request that includes multi-USS policy comprising an allowed USS;
send a multi-USS configuration response;
perform a USS change; and
send a USS change notification based on the multi-USS policy, including a cause for change of USS.

12. The UAV of claim 11, wherein the USS change notification is further based on receiving a USS change request from a UAE server.

13. The UAV of claim 11, wherein the multi-USS configuration request is a request to delete a first USS configuration and the the WTRU is further configured to remove the first USS configuration if the request to delete is associated with a USS that matches a USS associated with the UAE.

14. The UAV of claim 13, wherein the USS associated with the UAE holds a subscription for the UAV.

15. The UAV of claim 13, wherein the USS associated with the UAE previously authenticated and authorized the UAV.

16. The UAV of claim 11, wherein the WTRU is further configured to initiate communication based on the USS change.

17. The UAV of claim 11, wherein the multi-USS policy includes a rule for initiating a USS change wherein only a first USS can initiate a change.

18. The UAV of claim 11, wherein the multi-USS policy includes a rule allowing any allowed USS to initiate a USS change when a connection is lost with a first USS.

19. The UAV of claim 11 wherein the conditions under which the UAE client initiates a USS change include the UAE client moving from a first geographic area associated with a first USS to a second geographic area associated with a second USS.

20. The UAV of claim 11, wherein the multi-USS policy further comprises a geographical area in which the allowed USS is active.

* * * * *

UNITED STATES PATENT AND TRADEMARK OFFICE
CERTIFICATE OF CORRECTION

PATENT NO. : 12,160,785 B2
APPLICATION NO. : 18/681125
DATED : December 3, 2024
INVENTOR(S) : Ijaz et al.

Page 1 of 1

It is certified that error appears in the above-identified patent and that said Letters Patent is hereby corrected as shown below:

In the Claims
In Claim 11, at Column 33, Line 14, before the word "multi-USS" insert -- "a" --.

Signed and Sealed this
Eighteenth Day of February, 2025

Coke Morgan Stewart
*Acting Director of the United States Patent and Trademark Office*